US011244271B2

(12) United States Patent
Palmer et al.

(10) Patent No.: US 11,244,271 B2
(45) Date of Patent: **\*Feb. 8, 2022**

(54) METHOD OF MAKING CHANGES TO PRODUCT MIXES ON BOUNDARY CONSTRAINED SHELVES BY DETERMINING OPTIMAL BUSINESS METRICS FROM A PRODUCT MIX CONSTRAINED BY AT LEAST PHYSICAL SHELF SPACE AND AT LEAST ONE BUSINESS RULE

(71) Applicant: Red Analytics Pty Ltd, Surry Hills (AU)

(72) Inventors: Daniel Bruce Palmer, Bentonville, AR (US); Menkes Hector Louis van den Briel, Alexandria (AU); Mark Ross Lawrenson, Rockdale (AU)

(\*) Notice: Subject to any disclaimer, the term of this patent is extended or adjusted under 35 U.S.C. 154(b) by 0 days.

This patent is subject to a terminal disclaimer.

(21) Appl. No.: 17/016,720

(22) Filed: Sep. 10, 2020

(65) Prior Publication Data
US 2020/0410426 A1 Dec. 31, 2020

Related U.S. Application Data

(62) Division of application No. 16/232,135, filed on Dec. 26, 2018, now Pat. No. 10,803,415.

(51) Int. Cl.
*G06Q 10/06* (2012.01)
*G06Q 10/08* (2012.01)
(Continued)

(52) U.S. Cl.
CPC ....... *G06Q 10/06393* (2013.01); *G06N 20/00* (2019.01); *G06Q 10/04* (2013.01); *G06Q 10/087* (2013.01); *G06Q 30/02* (2013.01)

(58) Field of Classification Search
CPC .............. G06Q 10/087; G06Q 10/063; G06Q 30/0202; G06Q 30/02; G06Q 10/04; G06Q 10/06393
See application file for complete search history.

(56) References Cited

U.S. PATENT DOCUMENTS 6,366,890 B1 4/2002 Usrey
7,440,903 B2 10/2008 Riley
(Continued)

OTHER PUBLICATIONS

The Theory and Practice of Optimizing Assortment and Space The Category Management Association, 2014 (Year: 2014).
(Continued)

*Primary Examiner* — Scott L Jarrett
(74) *Attorney, Agent, or Firm* — H. Brock Kolls

(57) ABSTRACT

The present invention relates to a computer implemented method of determining optimal business metrics from a product mix constrained by at least physical shelf space and selectively by at least one business rule. The computer implemented method comprising the steps of defining a boundary constrained shelf space, placing, physically, a product mix within the boundary constrained shelf space, and creating a product mix ranking based, in part, on prior sales of each of the product type. The computer implemented method continues by using a data processing device to develop, through algorithmic autonomous learning, achievable business metric performance of the boundary constrained shelf space. In this regard, a group of similar product mix/ranking is optimized to create an ideal product mix/ranking which is then use to inform changes to make to the product mix to achieve the desired OPTIMAL BUSINESS METRIC.

20 Claims, 12 Drawing Sheets

(51) Int. Cl.
*G06N 20/00* (2019.01)
*G06Q 10/04* (2012.01)
*G06Q 30/02* (2012.01)

(56) References Cited

U.S. PATENT DOCUMENTS

| | | | |
|---|---|---|---|
| 11,068,919 B2* | 7/2021 | Palmer | ............... G06Q 30/0206 |
| 2001/0047293 A1 | 11/2001 | Waller | |
| 2002/0099597 A1 | 7/2002 | Gamag | |
| 2002/0147630 A1 | 10/2002 | Rose | |
| 2003/0200129 A1 | 10/2003 | Klaubauf | |
| 2005/0114196 A1 | 5/2005 | Schoenmeyr | |
| 2005/0203790 A1 | 9/2005 | Cohen | |
| 2007/0235465 A1 | 10/2007 | Walker | |
| 2008/0159634 A1 | 7/2008 | Sharma | |
| 2009/0006182 A1 | 1/2009 | Gammon | |
| 2009/0271245 A1 | 10/2009 | Joshi | |
| 2010/0145773 A1 | 10/2010 | Dasai | |
| 2011/0276364 A1 | 11/2011 | Bergstrom | |
| 2012/0123814 A1 | 5/2012 | Bottom | |
| 2014/0025420 A1 | 1/2014 | Joshi | |
| 2014/0058781 A1 | 2/2014 | Padmanabhan | |
| 2015/0112762 A1 | 4/2015 | Lahmar | |
| 2016/0335586 A1 | 11/2016 | Panchamgam | |
| 2017/0323367 A1 | 11/2017 | Crow | |
| 2018/0032934 A1 | 2/2018 | Chaneton | |
| 2019/0042995 A1 | 2/2019 | Nemati | |
| 2019/0180301 A1 | 6/2019 | Mahalanobish | |
| 2019/0279146 A1 | 9/2019 | Nakono | |
| 2020/0005209 A1 | 1/2020 | Rangarajan | |

OTHER PUBLICATIONS

Oracle Retail Assortment Planning—Users Guide for the RPAS Fusion Client ORACLE Jun. 2014 (Year: 2014).

Oracle Retail Assortment and Space Optimization Cloud Service User Guide ORACLE, Sep. 2015 (Year: 2015).

Hubner, Alexander et al. An integrated assortment and shelf-space optimization model with demand substitution and space elasticity effects, European Journal of Operational Research, vol. 261, 2017 (Year:2017).

* cited by examiner

Adding Rule

Rule: Single Level
Value:
Split:

Filter 1: Packgroup
Packgroup: 2 LITRE

Filter 2: Manufacturer
Manufacturer: MANUFACTURER A

Add Filter

UPC
Packgroup
Manufacturer
Supplier
Brand

*124*

CANCEL    APPLY    SAVE

*Fig. 1C*

METHOD OF MAKING CHANGES TO PRODUCT MIXES ON BOUNDARY CONSTRAINED SHELVES BY DETERMINING OPTIMAL BUSINESS METRICS FROM A PRODUCT MIX CONSTRAINED BY AT LEAST PHYSICAL SHELF SPACE AND AT LEAST ONE BUSINESS RULE

CROSS-REFERENCE TO RELATED APPLICATIONS

This application contains subject matter which is related to the subject matter of the following co-pending application. The below listed application is hereby incorporated herein by reference in its entirety:

This is a U.S. non-provisional application that is a divisional of a U.S. non-provisional application Ser. No. 16/232,135, inventor Daniel Bruce Palmer et al, entitled "METHOD OF DETERMINING OPTIMAL BUSINESS METRICS FROM A PRODUCT MIX CONSTRAINED BY AT LEAST PHYSICAL SHELF SPACE AND AT LEAST ONE BUSINESS RULE", filed Dec. 26, 2018.

TECHNICAL FIELD OF THE INVENTION

This invention relates to using a data processing device to develop, through algorithmic autonomous learning, an achievable business metric performance of a boundary constrained shelf space, and particularly to a computer implemented method of determining optimal business metrics from a product mix constrained by at least physical shelf space and selectively by at least one business rule.

BACKGROUND OF THE INVENTION

Before our invention products on a shelf generated sales that could be tracked but such sales tracking could not easily be used to identify similar products in other locations exhibiting similar sales tracking patterns. As such, aggregating, deducing, and benefitting from strategic learnings, from the sales activities of many similar products on many similar shelves, have been unattainable. Furthermore, the use of such learnings to form recommendations of product mix, product type, product price, and other, as well as gauge the sales performance of a mix of products on a shelf to determine if optimal business metrics are being achieved has been an aspirational desire of marketers.

Another shortcoming before our invention, in the absence of an ability to determine what optimized or maximized sales of products from a shelf space look like, ascertaining the impact to sales of a pricing strategy has been impossible. In this regard, adding more of a product type for a promotion might require removal of a different product type to make space on the shelf. These types of changes are common and can impact sales, but calculating the true cost of a pricing strategy has been elusive and calculating the cost without actually making physical product mix changes (virtually testing pricing strategies) has been even more elusive.

Another shortcoming before our invention is that it is difficult to spot business improvement opportunities in reports when seemingly unrelated vast amount of sales and marketing data are being generated from lots of products being sold at many different locations. While a single selling strategy might be implementable across many locations seldom is a single strategy applicable when diverse locations, products, shopper preferences, community needs, and demographics are involved. While data reports are informative, deducing actionable insights and identifying performance improving strategies is simple not practical by human analysis or with only hard rule analysis.

Another shortcoming before our invention is that it was difficult to run 'what if' scenarios to see how a change might impact business performance without physically changing products or product arrangement on shelves, which could be a costly and time consuming hassle. Furthermore, to the extent that changes at the software level were made, there were few options to visually see how such changes would physically impact product displays. Often such blind changes led to product placement on shelves that made it confusing or difficult for the customer to shop. Expensive industry personnel with lots of experience have been required to setup prior system. Complicated and ridge in setup, even the slightest change could require significant reprogramming, incurring cost and lost time.

For these reasons and shortcomings as well as other reasons and shortcomings there is a long felt need that gives rise to the present invention.

SUMMARY OF THE INVENTION

The shortcomings of the prior art are overcome and additional advantages are provided through the provision of a computer implemented method of determining optimal business metrics from a product mix constrained by at least physical shelf space and selectively by at least one business rule.

The computer implemented method comprising the steps of defining a boundary constrained shelf space, the boundary constrained shelf space is managed by a customer, placing, physically, a product mix within the boundary constrained shelf space, the product mix comprising at least one of a product type, and creating a product mix ranking based, in part, on prior sales of each of the product type.

The computer implemented method continuing with the steps of developing, through algorithmic autonomous learning, an achievable business metric performance of the boundary constrained shelf space by way of at least one of a data processing device, the data processing device having a memory which is encoded with instructions that when executed perform steps. The steps include identifying a group based, in part, on the boundary constrained shelf space and the product mix ranking, the group having at least one of a similar product mix or a similar product mix ranking, the similar product mix comprising at least one of a similar product type and determining an OPTIMAL BUSINESS METRIC, in view of, if present, at least one of a business rule, for the boundary constrained shelf space. Such steps include optimizing an ideal product mix ranking using the product mix and algorithmic autonomous learning from at least some of the similar product mix or the similar product mix ranking from the group, the ideal product mix comprising at least one of an ideal product type.

Another step includes converting the ideal product mix ranking into at least one of an ideal product mix or an ideal product type placement within the boundary constrained shelf space.

Other steps includes applying, if present, an algorithmic impact of at least one of a business rule on the ideal product mix, the ideal product mix ranking, or the ideal product type placement within the boundary constrained shelf space and forecasting through simulation, sales of the ideal product mix over time to achieve the OPTIMAL BUSINESS METRIC.

Additional steps include creating space-product-price awareness for the customer by displaying details, values, or recommendations based on at least one of the OPTIMAL BUSINESS METRIC, the ideal product mix, or the ideal product type placement within the boundary constrained shelf space and returning to the step defining, to track and optimize the OPTIMAL BUSINESS METRIC over time.

Additional shortcomings of the prior art are overcome and additional advantages are provided through the provision of exemplary embodiments wherein the optimal business metrics can be determined by using several different types of parameters. Such parameters can selectively be an OPTIMAL BUSINESS METRIC, a FUTURE SALES AMOUNT, or an OPTIMAL SALES REVENUE AMOUNT. The computer implemented methods, in the present invention, illustrate selection between all three parameters. In operation, ideally one parameter at a time would be selected and consistently utilized throughout the computer implemented method to perform the analysis. As an example and not a limitation, selecting the OPTIMAL SALES REVENUE AMOUNT as the parameter and consistently using it through the computer implemented method.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1B illustrates one example of an opportunity pricing strategy user interface;

FIG. 1C illustrates one example of a business rule create and edit user interface;

Figure 1A:
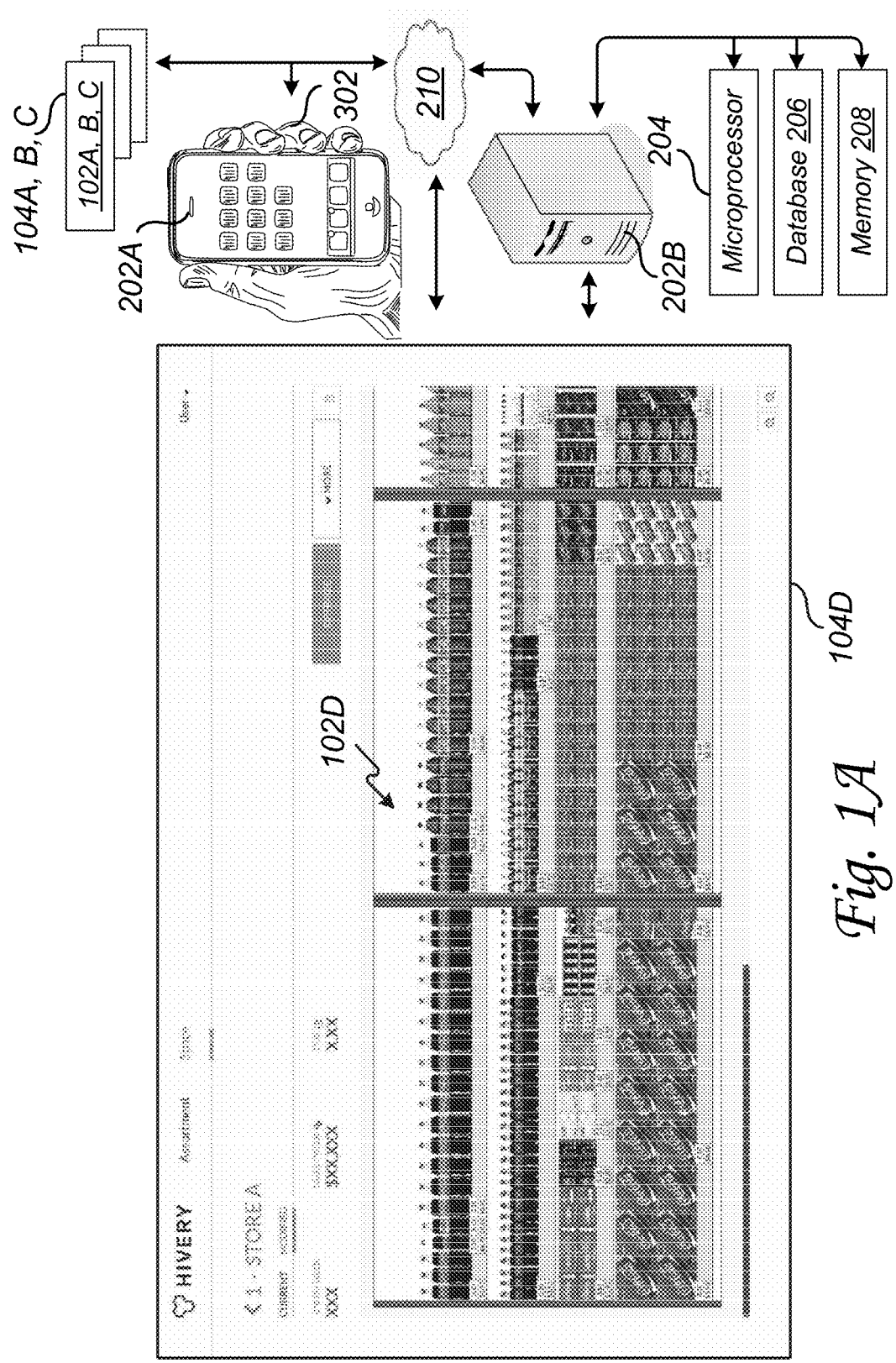
FIG. 1A illustrates one example of product mix on a boundary constrained shelf space and network diagram.

The detailed description explains the preferred embodiments of the invention, together with advantages and features, by way of example with reference to the drawings.

DETAILED DESCRIPTION OF THE INVENTION

An advantage, in the present invention, is that it allows a customer or user of the system to conduct 'what if' type planning scenarios by changing rules and parameters and then effectuate the algorithmic autonomous learning data processing aspects of the invention to develop insights and run simulations which forecast and/or otherwise predict the impact of the 'what if' scenario on business metrics. As an example, how a planning scenario might impact revenue or other scenarios, as may be required and or desired in a particular embodiment. The ability to simulate allows planning scenarios to be tested before making any physical changes to the product mix on shelves at locations.

Another advantage, of the present invention, is to be able to visualize how business rules will physically change the look of a product mix placed on a boundary constrained shelf space. Certain business rules can cause products to be relocated on a shelf and while such changes might meet a performance objective it can render the products on the shelf difficult for a customer to shop and access. As an example, certain business rules may place heavy items on the top shelf, but doing so makes it hard for consumers to reach and safely remove. As such, the algorithmic autonomous learning data processing aspects, in the present invention, create the ability to simulate business rule changes and virtually visualize the impact of those changes, on product placement, on the shelf, as illustrated in at least FIG. 1A. This makes visually verifying the impact of business rules on product display easy, which leads to 'pretty' product displays that are customer friendly to shop.

Another advantage, in the present invention, is that the algorithmic autonomous learning data processing approach acts as a smart space solver, determining product placement on the shelf automatically. Prior art solutions need to be told how to solve product fitment within a space. As an example, prior art approaches based on procedural programming required user to maintain the business rules in their mind while specify steps which do not inherently satisfy business rules (example product facing needed, product orientation, and other display requirements). In the alternative, the present invention inherently provides optimal space recommendations optimizing product mix layout within the boundary constrained shelf space while satisfying applied business rules automatically.

Another advantage, in the present invention, is that new business rules can be developed and tested on-the-fly. In this regard, a user can develop a new business rule and test the business impact of the rule through algorithmic autonomous learning, forecasting, and simulation. This on-the-fly analysis allows a customer or user to optimize rules through iterative testing, virtually, before any product on the shelf is physically touched. At least FIG. 1C illustrates how business rules 122 using a series of filters 124 can be created.

Another advantage, in the present invention, is that inherently the system performs much of what in the past would have taken someone years in an industry to learn. In this regard, the power of autonomous learning at the data processing level simply enables machines to iteratively optimize best-fit solutions, eliminating the need for high cost human domain expertise. The technology empowers more people with less domain knowledge to run smarter and more profitable businesses by using the present invention.

Turning now to the drawings in greater detail, it will be seen that in FIG. 1A there is illustrated one example of a product mix on a boundary constrained shelf space and network diagram. In an exemplary embodiment, a plurality of boundary constrained shelf spaces 104A-D can have thereon respectively product mixes 102A-D. Illustrated is a digital version representation of the physical shelf space and physical product mix. Large numbers of boundary constrained shelf spaces 104 and product mix 102 can be network and physically managed through data processing devices such as data processing device 202A. Such digital representations of physical boundary constrained shelf spaces 104 and product mix 102 effectuate the ability to rely on digital images to ensure the physical product types forming the product mix 102 are placed correctly on the boundary constrained shelf spaces 104.

For disclosure purposes, the boundary constrained shelf space 104 and physical product mix 102 will be "physical" or digital representation of physical product and spaces. Whereas the "similar" boundary constrained shelf space and "similar" product mix and associated elements thereof illustrated in at least FIGS. 3, 4, 5-7, 8A-B, and 9 are manifest as digital representation based on database data collected from a plurality of product mix 102, product mix rankings, boundary constrained shelf spaces 104, and other data. Continuing, the "ideal" boundary constrained shelf space and "ideal" product mix and elements thereof are determined synthesized through data processing device effectuated algorithmic autonomous learning include rules conformance, mathematically developed insights, and other computational structures and methodologies, as may be required and/or desired in a particular embodiment.

For disclosure purpose a boundary constrained shelf space with associated product mix, product mix rankings can be represented as a product mix/ranking/shelf space.

Use of the term "data processing device" or "data processor" is intended to mean, in the present invention, a microprocessor 204 based device operationally related to a database 206 and a memory 206. The memory being able to be encoded with instructions that when executed perform desired method steps of the present invention. The data processing device is network-enabled and can data communicate with other network-enabled devices. Such communication can be over a global network 210, such as the Internet. Such a data processing device 202A-B can be a server, personal computer, mobile device, tablet, laptop, or other types and kinds of data processing devices collectively referred to as data processing device 202, as may be required and/or desired in a particular embodiment. Such data processing devices 202 can be used by a customer 302, also referred to as a user or other type of person, as may be required and/or desired in a particular embodiment. A customer 302 can be an operator, store owner, corporate entity, or other, as may be required and/or desired in a particular embodiment.

Database 206 can be a single database or a collection of databases. Such accessible databases can include diverse sets of data including, but not limited to, numerous product mixes, product rankings, boundary constrained shelf spaces, location information, demographics, and all the product information, product type, product size, and/or the sales and marketing data, as may be required and or desired in a particular embodiment. Furthermore, such databases can include diverse sets of data including customer, merchant, location, or other loyalty data for managing a loyalty program. In addition, such databases can include diverse sets of data of shopper and market data and other types and kinds of data, as may be required and or desired in a particular embodiment.

Figure 1B:
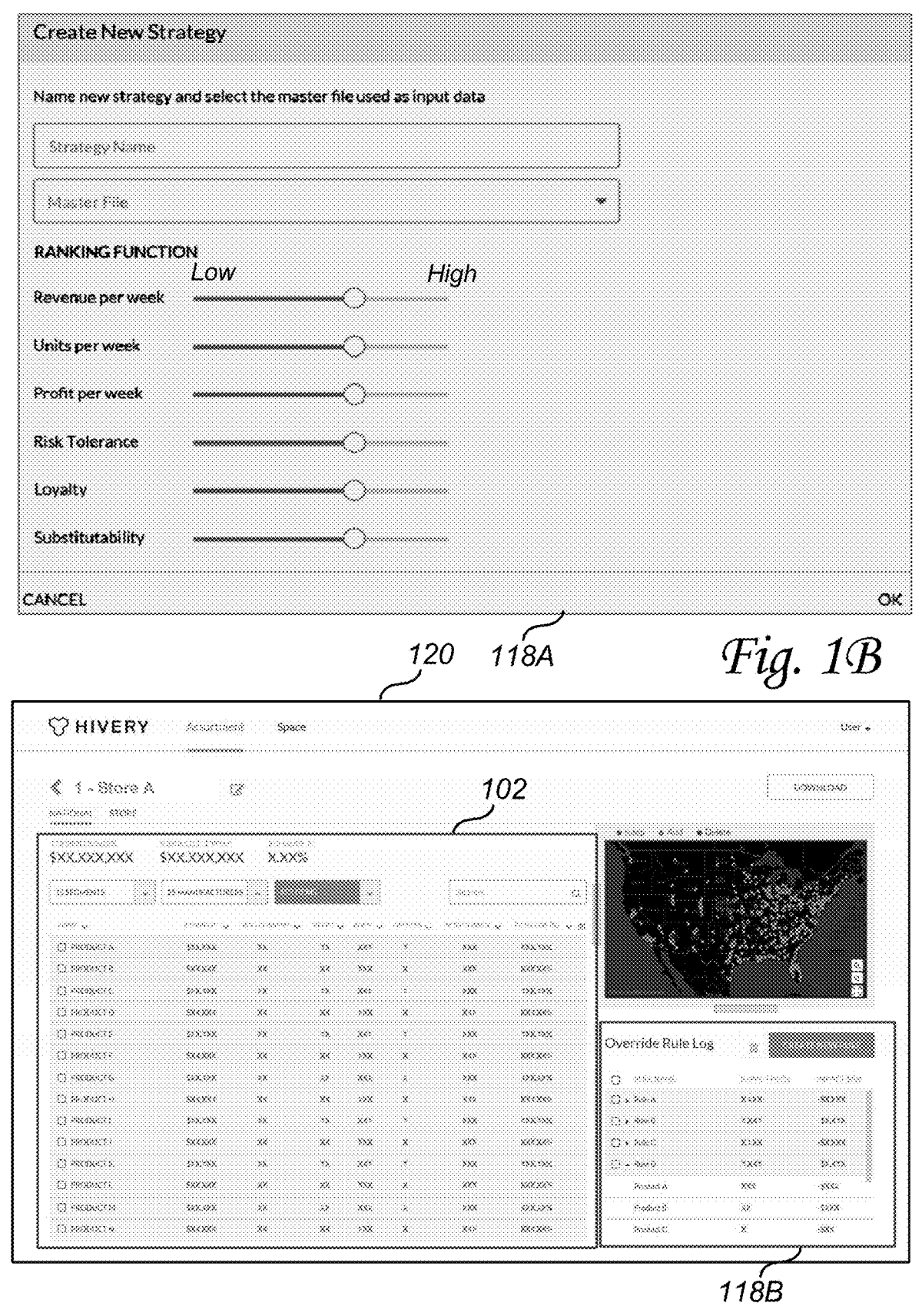

Referring to FIG. 1B there is illustrated one example of an opportunity pricing strategy user interface 118A. In an exemplary embodiment, the opportunity pricing strategy user interface 118A can be organized as a series of low-to-high weighted preferences, at least one selected from list comprising: REVENUE PER WEEK, UNIT PER WEEK, PROFIT PER WEEK, RISK TOLERANCE, CUSTOMER LOYALTY, SUSTAINABILITY of the pricing strategy, and/or others, as may be required and/or desired in a particular embodiment.

FIG. 1B also illustrates a product mix 102 listing with associated details and statistics for each item in the product mix, as well as a business rule listing 118B that is applied to the product mix and associated boundary constrained shelf space.

Referring to FIG. 1C there is illustrated one example of a business rule create and edit user interface 122. In an exemplary embodiment, using the interface 122, a user can create and edit a business rule. Business rules can be test through algorithmic autonomous learning data processing virtually to determine how they would impact business metrics. When ready the business rule can then be applied to a live product mix/rankings/shelf space. In creating or editing business rules a customer or user can select different filters 124. Such filters 124 can be for example and not a limitation, sorting by brand, manufactures UPC code, supplier, or other, as may be required and/or desired in a particular embodiment.

Figure 2:
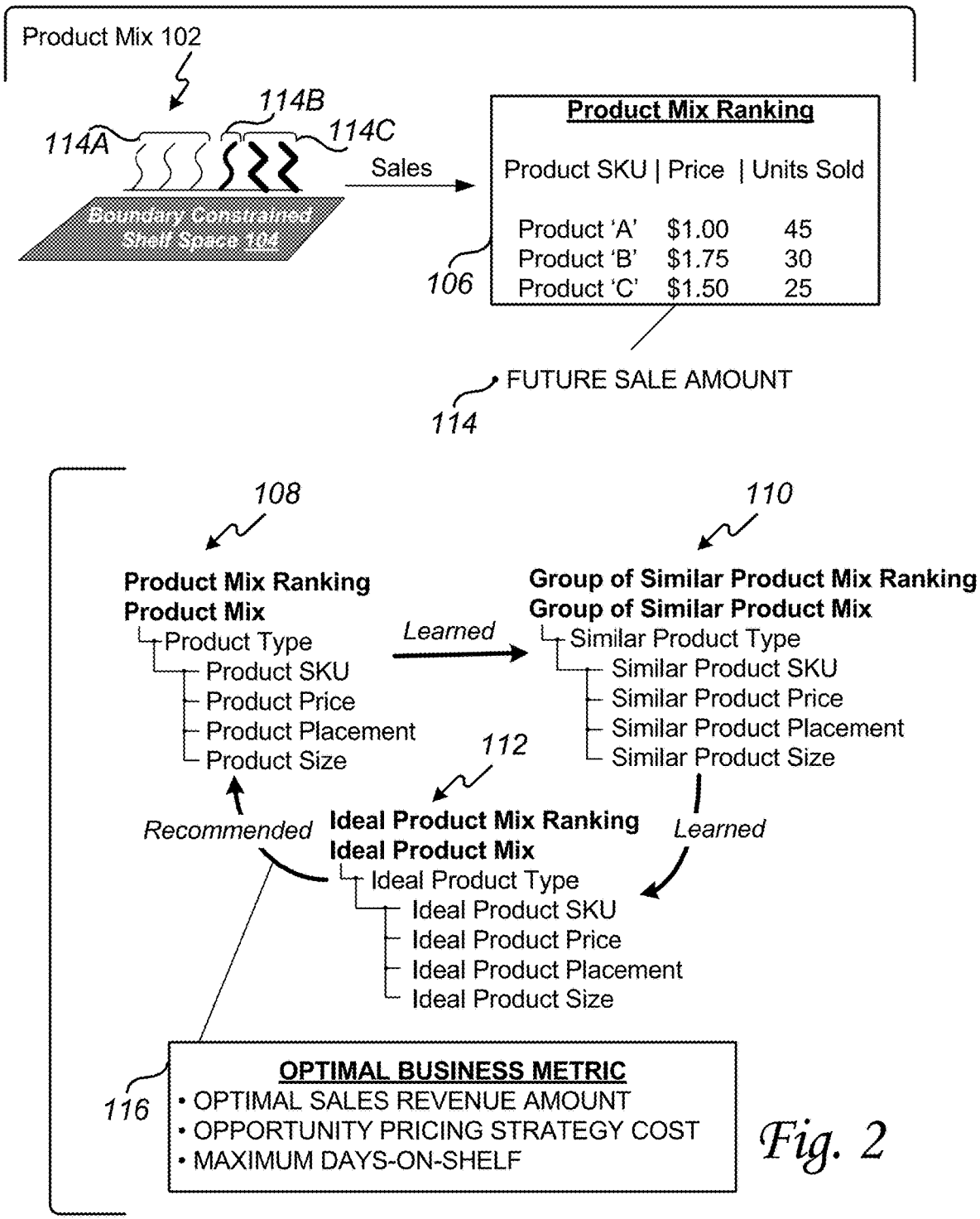
FIG. 2 illustrates one example of determining optimal business metrics or cost of implementing a pricing strategy using algorithmic autonomous learning.

Referring to FIG. 2 there is illustrated one example of determining optimal business metrics or cost of implementing a pricing strategy using algorithmic autonomous learning. In an exemplary embodiment, a product mix 102 comprising a variety of different stock keeping units (SKU) as an example, 114A, 114B, and 114C can be placed on a boundary constrained shelf space 104. Sales can then be tracked to produce a product mix ranking 106 which comprises at least some of a product SKU, a product price, a product size, a product placement recommendation within the boundary constrained shelf space, or other, as may be required and/or desired in a particular embodiment.

Use of the term "product mix", in the present invention, is intended to mean a collection of different products, referred to as product types, which are organized into a group. As an example, a product mix 102 can be a group of ready to drink beverage, a group salty snack, or other, as may be required and/or desired in a particular embodiment. Such product mix 102 is commonly found in a grocery store aisle, wherein a series of different product mixes are organized on the shelves and made accessible to customers.

Use of the term "product mix ranking", in the present invention, is intended to mean the sale and marketing data generated when product types from the product mix are sold. Such is illustrated in at least FIG. 2 and corresponding disclosure.

Use of the term "FUTURE SALES AMOUNT", in the present invention, is intended to mean a forecast of future sales using the velocity of current sales from the product mix ranking. Such FUTURE SALES AMOUNT can be predictions of sales in the future measured in hour, days, weeks, months, year, or other time period, as may be required and/or desire in a particular embodiment.

Use of the term "boundary constrained shelf space", in the present invention, is intended to mean a physical space which defines a boundary, such as height, width, length, surface area, and the number of shelves where a product mix 102 is placed. It is the product mix 102 which contains a finite number and SKU types of product, each with a defined size, in combination with the limited boundary constrained shelf space 104, that creates the necessity to optimize the product SKU and pricing to meet desired optimal business metrics.

Use of the term "OPPORTUNITY PRICING STRATEGY COST", in the present invention, is intended to mean the economic impact of changing the product mix versus the current mix or more ideally the optimal mix. As an example and not a limitation, changes to one or more product SKU can have an impact on the amount of revenue the product mix constrained by the shelf space boundary produces. These revenue impacts can be characterized as the cost of implementing a pricing strategy. As an example, Coke, Diet Coke, and Coke Zero form the product mix 102 within a boundary constrained shelf space 104 and consistently produce revenue 'X'. If the product mix is changed to Coke, Diet Coke, and Fanta Orange there will likely be a corresponding revenue impact after removing Coke Zero and adding Fanta, expressed as revenue 'Y'. In this example, the cost of implementing a pricing strategy can be characterized as the difference between 'X' and 'Y'.

The product mix ranking 106 from a single shelf space can be used in algorithmic autonomous learning routines with a plurality of other product mix rankings from a plurality of other shelf spaces to develop insights into the product mix to optimize desired business metrics, such as optimal sales revenue and others. By way of algorithmic autonomous learning using information gathered and learned from product mix rankings future sales forecasts, optimal sales predictions, the cost of implementing a pricing strategy and other marketing strategies can be simulated.

Use of the term "algorithmic autonomous learning', in the present invention, is intended to mean a computational methodology performed by data processing equipment 202 using a collection of product mix rankings from a plurality of product mixes, a plurality of boundary constrained shelf spaces, and other data to form learned insights, develop algorithmic rules, and determine optimizations which inform at least changes to product mixes with the intent to reach desired business metric, determine the opportunity cost of pricing strategies, quantify business impact of strategies, and other informatics deductions that require elements of large data processing and data processing devices configured for autonomous learning capabilities.

In operation, the vast accessible data in the databases 206 can be consumed as needed by the data processing device implemented autonomous learning routines to shape the algorithms which are then used to form actionable insights and develop recommendations which evaluate, track, and/or otherwise trend product mix/rankings/shelf space toward achieving desired business metrics, as may be required and/or desired in a particular embodiment.

An advantage, in the present invention, of using data processing effectuated autonomous learning is that more insights can be learned by computing on more data than is humanly possible to understand. In this regard, what would take months of human hand calculations and comparisons using tradition data dump type reports is now handled autonomously by the data processor in a manner that extracts insight from data to improve the desired business metrics. With these learned business insights algorithmically through simulation, a hypothesis can be validated using large amounts of live site data. The result is that recommendations to product mix/ranking/shelf space changes to managed and customized down to the individual product mix and boundary constrained shelf space. Such an approach allows different kinds of OPTIMAL BUSINESS METRICS to be selected by a customer and then through algorithmic autonomous learning the data processing device can begin developing recommendations on how to modify the product mix/ranking/shelf space to trend toward achieving the selected OPTIMAL BUSINESS METRIC. Even more flexible, when a customer decides to change the OPTIMAL BUSINESS METRIC, the recommendations automatically change to trend towards achieving the new OPTIMAL BUSINESS OBJECTIVE automatically.

As an example, in operation, FIG. 2 illustrates product mix which creates a product mix ranking based, in part, on prior sales of each of the product type in the product mix (illustrated collectively as 108). Product type can also include a product SKU, a product price, a product size, a product placement recommendation within the boundary constrained shelf space, or other, as may be required and/or desired in a particular embodiment.

Algorithmic autonomous learning, explores the business metric performance of the boundary constrained shelf space 104 by way of at least one of a data processing device. In operation, the data processing device having access to needed data in a database and a memory which is encoded with instructions that when executed perform steps.

The first step being to identify a group based, in part, on the boundary constrained shelf space and the product mix ranking, the group having at least one of a similar product mix or a similar product mix ranking, the similar product mix comprising at least one of a similar product type (illustrated collectively as 110). Similar product type can also include a similar product SKU, a similar product price, a similar product size, a similar product placement recommendation within the boundary constrained shelf space, or other, as may be required and/or desired in a particular embodiment.

The next step is to determine an OPTIMAL BUSINESS METRIC, in view of, if present, a business rule, for the boundary constrained shelf space by optimizing an ideal product mix ranking using the product mix and algorithmic autonomous learning from at least some of the similar product mix or the similar product mix ranking from the group. The ideal product mix comprising at least one of an ideal product type (collectively illustrated as 112). Ideal product type can also include an ideal product SKU, an ideal product price, an ideal product size, an ideal product placement recommendation within the boundary constrained shelf space, or other, as may be required and/or desired in a particular embodiment.

Next, the ideal product mix ranking is converted into at least one of an ideal product mix or an ideal product type placement within the boundary constrained shelf space and if present, an algorithmic impact of the business rule is applied to the ideal product mix, the ideal product mix ranking, or the ideal product type placement within the boundary constrained shelf space.

Recommendations (collectively illustrated as 116) can then be provided through simulated product demand forecasting of the sales of the ideal product mix over time to achieve the OPTIMAL BUSINESS METRIC, OPPORTUNITY SALES REVENUE AMOUNT, OPPORTUNITY PRICING STRATEGY COST, MAXIMUM DAYS-ON- SHELF, and other business metrics, as may be required and/or desired in a particular embodiment.

Use of the term "OPTIMAL BUSINESS METRIC", in the present invention, is intended to mean a measurement of how the product mix is performing from a sales, revenue, loss of revenue, product availability, cost of sale, pricing model, and/or other business metrics. In an exemplary embodiment, a business metric by which to optimize can be selected, as an example maximize revenue, maximum days-on-shelf, or other business metrics. The data processing facilitated algorithmic autonomous learning then seeks to compare the instant product mix ranking to groups of similar product mix/rankings to form idealized product mixes which can serve as the basis of recommendations that a user or customer can effectuate to the actual physical product mix on the physical boundary constrained shelf space. Over time this analysis informs the necessary changes to reach the desired OPTIMAL BUSINESS METRIC and then continues tracks consistency with the OPTIMAL BUSINESS METRIC over time.

Use of the term "OPTIMAL SALES REVENUE AMOUNT", in the present invention, is intended to mean one of the OPTIMAL BUSINESS METRICS related to product mix sale over time, which causes the data processing facilitated algorithmic autonomous learning to compare the instant product mix ranking to groups of similar product mix/rankings, to form idealized product mixes which can form the basis of recommendation that a user can make to the actual physical product mix on the physical boundary constrained shelf space to achieve the forecasted optimal revenue obtainable from the boundary constrained shelf space in view of any required business rules.

Use of the term "MAXIMUM DAYS-ON-SHELF", in the present invention, is intended to mean optimized product mix quantities of each product type SKU so that with predicted sales velocity of the product mix inventory is equally depleted to minimize out of stocks. In this regard, the MAXIMUM DAYS-ON-SHELF is the number of days before an out of stock condition of a product type SKU occurs and maximization is an optimization of the initial restock inventory quantity given the boundary constrained shelf space conditions and any imposed business rules.

Use of the terms "business rules", "pricing strategy business rules", and "maximum days-on-shelf business rule", in the present invention, is intended to mean algorithmic or other constraints placed on the product mix, boundary constrained self space, or other, as may be required and/or desired in a particular embodiment. In an exemplary embodiment, for example, and not a limitation, business rules can include a requirement to place certain product types, such as two-liter ready to drink beverages on the lower shelf so a consumer can easily pick them up from the shelf. Another business rule could be to require certain product types and/or a certain number of shelf facings of a product type. Such business rules can tailor a product mix to a store or vendor's preferences. Imposing business rules can also have impacts on certain business metrics.

Figure 3:
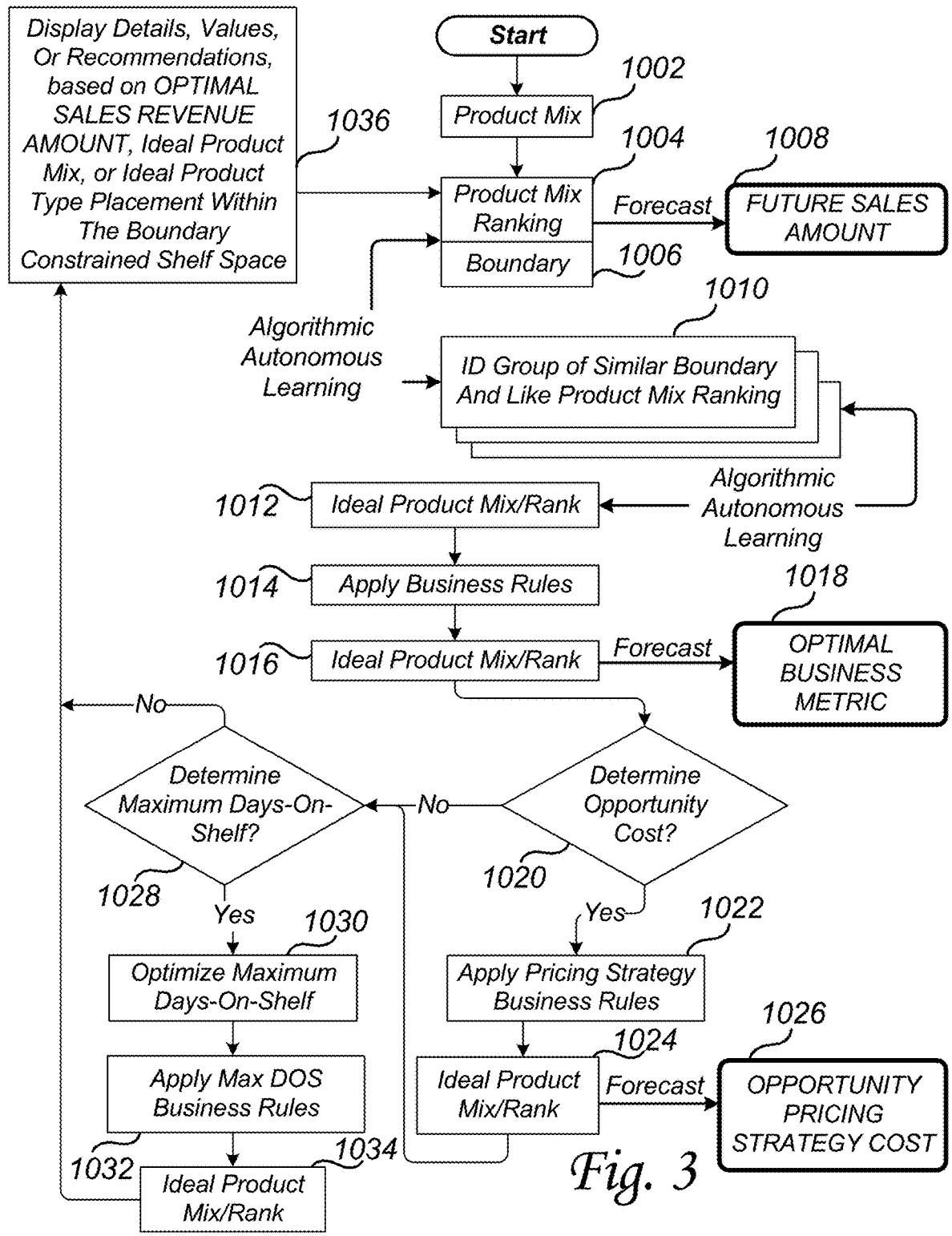
FIG. 3 illustrates one example of a computer implemented method of determining optimal business metrics from a product mix.

Referring to FIG. 3, there is illustrated one example of a computer implemented method of determining optimal business metrics from a product mix. This high-level exemplary embodiment provides an overview of the computer implemented method and several options which start in block 1002. A detailed method of determining optimal business metrics is provided in at least FIGS. 5, 6, and 7. For disclosure purpose a boundary constrained shelf space with associated product mix, product mix rankings can be represented as a product mix/ranking/shelf space.

In block 1002 a product mix 102 is determined and placed in a boundary constrained shelf space 104. The initial product mix can be selected by any preferred method. Such product mix selection method might include customer or store preference, other methods might include a standard initial assortment or other methods as may be required and/or desired in a particular embodiment. Over time recommended changes to the product mix drive results towards reaching a selected OPTIMAL BUSINESS METRIC. Such OPTIMAL BUSINESS METRIC might be for example and not a limitation, an OPTIMAL SALES REVENUE AMOUNT that is the forecasted best possible product mix to yield the highest sales from the boundary constrained shelf space. Optionally, other OPTIMAL BUSINESS METRIC can be selected, as may be required and/or desired in a particular embodiment. The computer implemented method moves to block 1004.

In block 1004, a product mix ranking 106 begins to develop as product types from within the product mix are sold.

When the product mix ranking is combined with the boundary constrained self space parameters, such as shelf area, height, width, length, number of shelves, and other parameters, velocity of sales over time can be used to predict or otherwise forecast FUTURE SALES AMOUNT 1008, such as per day, week, month, year, or other for the boundary constrained shelf space.

Such product mix, product mix rankings, boundary constrained shelf space parameters, and other parameters collected from a plurality of locations are used by data processing equipment 202 to train algorithms in an autonomous learning manner. In an exemplary embodiment, in operation, algorithmic autonomous learning can be applied between individual product mix/ranking/shelf spaces and groups of similar product mixes having similar product mix rankings and similar boundary constrained shelf spaces 1010.

Once an ideal product mix and ideal product mix ranking are determined business rules, if present, can be applied 1014, adjusting the ideal product mix and rankings 1016 accordingly. The adjusted ideal mix and rankings can be used to forecast OPTIMAL BUSINESS METRICS and develop recommendations to reach them. Such data processing can then drive algorithmic autonomous learning to create ideal product mix and ideal product mix rankings 1012 which inform insights and form recommendations on how a customer can make changes to the product mix/ranking/shelf space to drive beneficial optimal business metric performance towards the ideal product mix/ranking/shelf space.

Optionally, the opportunity cost of implementing a pricing strategy 1020 can be tested or otherwise determined by applying, if present, pricing strategy business rules to the ideal product mix and ranking 1022 to adjust the ideal product mix and rankings 1024 and the forecasting the OPPORTUNITY PRICING STRATEGY COST 1026. The OPPORTUNITY PRICING STRATEGY COST can be calculated as the difference between the TOTAL MEMBER OPTIMAL SALES REVENUE AMOUNT and the TOTAL MEMBER OPPORTUNITY PRICING STRATEGY SALES REVENUE AMOUNT. Alternatively, the OPPORTUNITY PRICING STRATEGY COST can be calculated as the difference between the TOTAL MEMBER FUTURE SALE AMOUNT and the TOTAL MEMBER OPPORTUNITY PRICING STRATEGY SALES REVENUE AMOUNT. At least FIGS. 8A, 8B, and corresponding disclosure illustrate how the OPPORTUNITY PRICING STRATEGY COST can be calculated.

For disclosure purposes some of the computations and methods involve selecting a group of product mix/ranking/shelf spaces to work with. Such a group is referred to as a cohort and the product mix/ranking/shelf spaces selected to be part of the cohort are referred to as MEMBERS. Use of the prefix term "MEMBER . . . " ahead of a defined term, for example and not a limitation, MEMBER OPTIMAL SALES REVENUE AMOUNT is intended to mean the OPTIMAL SALES REVENUE AMOUNT determined for a MEMBER of the cohort. Such nomenclature also applies to other defined terms too, such as MEMBER FUTURE SALES AMOUNT, MEMBER OPPORTUNITY PRICING STRATEGY SALES REVENUE AMOUNT, MEMBER OPTIMAL BUSINESS METRIC, and others as disclosed herein.

Optionally, a MAXIMUM DAYS-ON-SHELF (Max DOS) can be determined 1028. Such determination can be effectuated by way of an optimized MAXIMUM DAYS-ON-SHELF determination 1030 operating on the ideal product mix/ranking/shelf space. If present, the maximum days-on-shelf business rules are applied 1032 and the ideal product mix/ranking/shelf space adjusted 1034. Details and recommendations related to the ideal product mix, rankings, and other information are displayed 1036 and used to inform recommended changes to the product mix/shelf space to trend towards achieving the desired business metrics.

The computer implemented method repeats such that the product mix sales continue to create product mix rankings. The rankings between individual product mix/rankings and groups of similar product mix/rankings drive algorithmic autonomously learning. Results create ideal product mix/ranking which can be operated on, in view of business rules, to determine the OPTIMAL BUSINESS METRIC of choice. Options can selectively be chosen for further determining OPPORTUNITY PRICING STRATEGY COST and MAXIMUM DAYS-ON-SHELF. The results combine as recommendations a customer, user, or other that can adapt by making changes to the product mix/shelf space to better achieve the OPTIMAL BUSINESS METRICS, goals, and objectives.

Figure 4:
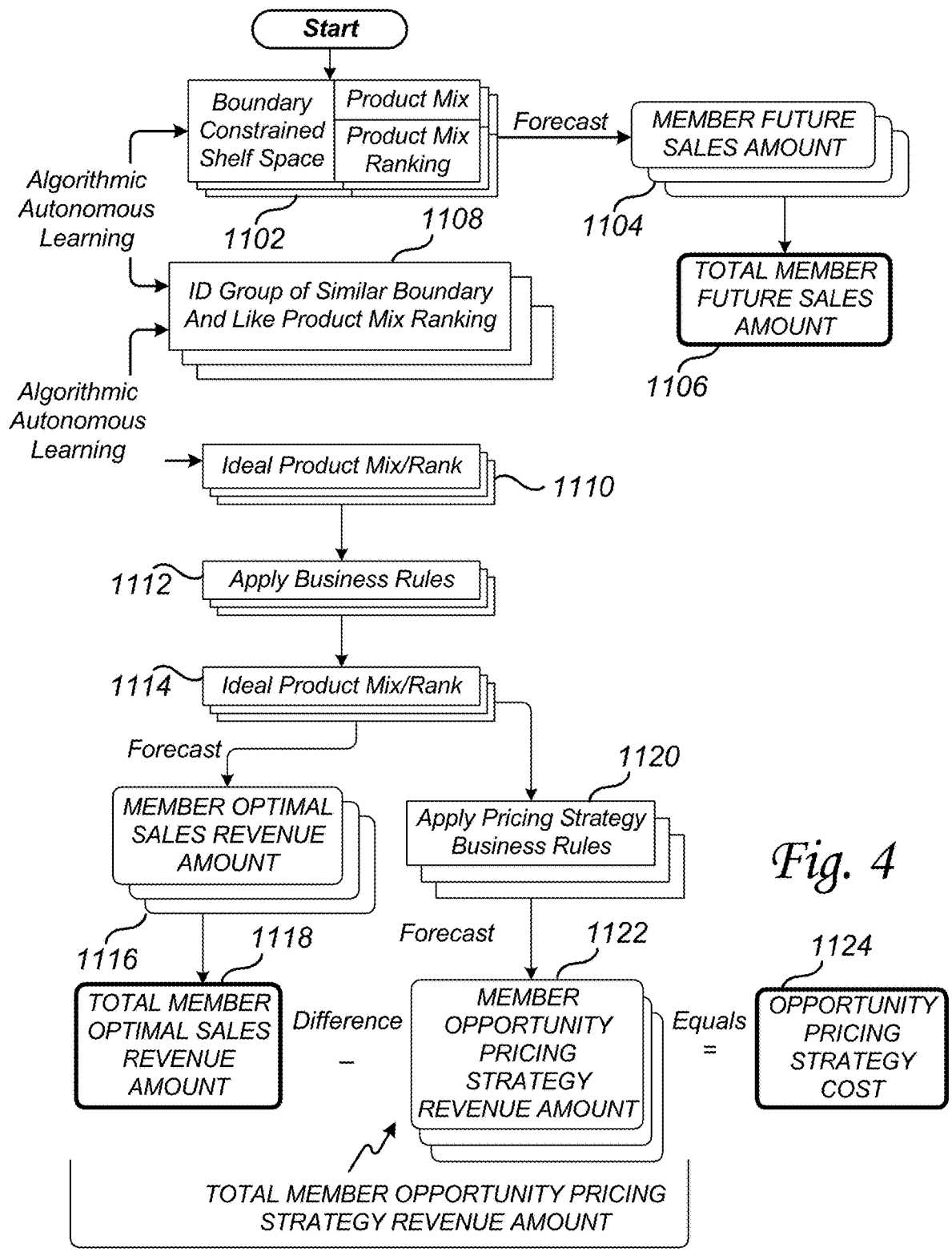
FIG. 4 illustrates one example of a computer implemented method of determining the cost of implementing a pricing strategy.

Referring to FIG. 4, there is illustrated one example a computer implemented method of determining the cost of implementing a pricing strategy. This high-level exemplary embodiment provides an overview of the computer implemented method which starts in block 1102. A detailed method of determining the cost of implementing a pricing strategy is provided in at least FIGS. 8A, 8B, 9, and corresponding disclosure.

In block 1102, a cohort of at least one of a boundary constrained shelf space with associated product mix, product mix rankings can be formed. For disclosure purpose a boundary constrained shelf space with associated product mix, product mix rankings can be represented as a product mix/ranking/shelf space.

Each member of the cohort can then be forecasted to determine a MEMBER FUTURE SALES AMOUNT 1104. Each of the MEMBER FUTURE SALES AMOUNT can be summed to determine a TOTAL MEMBER FUTURE SALES AMOUNT total for entire cohort 1106.

For each member of the cohort, a group based, in part, on the boundary constrained shelf space and the product mix ranking, the group having at least one of a similar product mix/ranking/shelf space can be identified 1108.

In an exemplary embodiment, in operation, algorithmic autonomous learning can be applied to each member in the cohort to create ideal product mix and ideal product mix rankings 1110. If present business rules can be applied 1112 and the ideal product mix/rankings adjusted 1114.

The ideal product mix/ranking/shelf space for each member of the cohort can be used to forecast a MEMBER OPTIMAL SALES REVENUE AMOUNT 1116 and each of the cohort member's MEMBER OPTIMAL SALES REVENUE AMOUNT can be summed to determine a TOTAL MEMBER OPTIMAL SALES REVENUE AMOUNT 1118.

Each member of the cohort can have pricing strategy business rules applied to their respective ideal product mix/rankings/shelf space 1120. Forecasting determines for each cohort member a MEMBER OPPORTUNITY PRICING STRATEGY REVENUE AMOUNT 1122. The individual MEMBER OPPORTUNITY PRICING STRATEGY REVENUE AMOUNT for each cohort member can be summed to calculate the TOTAL MEMBER OPPORTUNITY PRICING STRATEGY REVENUE AMOUNT and the difference between the TOTAL MEMBER OPTIMAL SALES REVENUE AMOUNT and the TOTAL MEMBER OPPORTUNITY PRICING STRATEGY REVENUE AMOUNT equals the OPPORTUNITY PRICING STRATEGY COST 1124.

Figure 5:
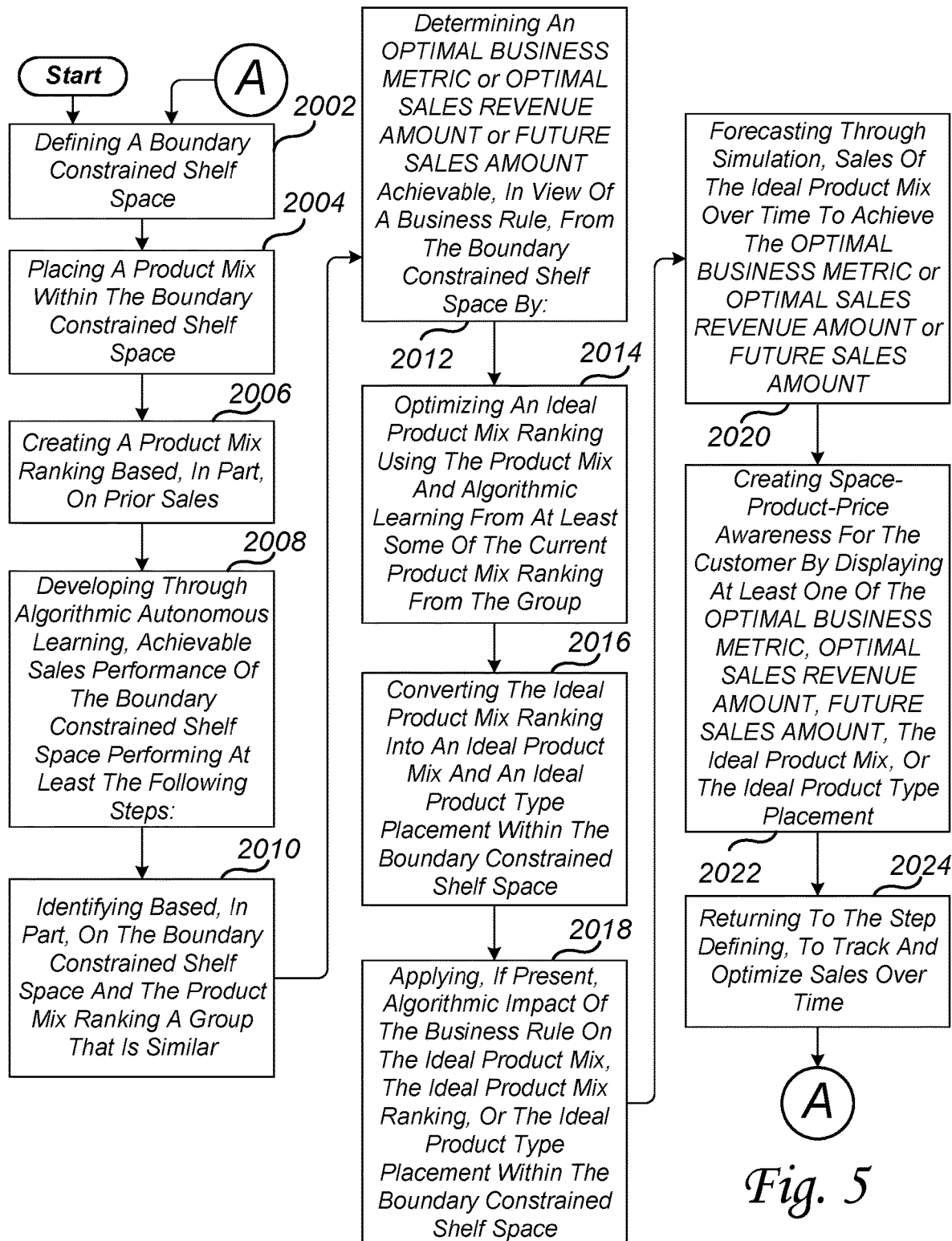
FIG. 5 illustrates one example of a computer implemented method of determining optimal business metrics from a product mix.

Referring to FIG. 5, there is illustrated one example of a computer implemented method of determining optimal business metrics from a product mix. In an exemplary embodiment, the computer implemented method of determining optimal business metrics from a product mix is constrained by at least physical shelf space and selectively by at least one business rule.

In an exemplary embodiment the optimal business metrics can be determined by using several different types of parameters. Such parameters can selectively be an OPTIMAL BUSINESS METRIC, a FUTURE SALES AMOUNT, or an OPTIMAL SALES REVENUE AMOUNT. The computer implemented methods, in the present invention, illustrate selection between all three parameters. In operation, ideally one parameter at a time would be selected and consistently utilized throughout the computer implemented method to perform the analysis. As an example and not a limitation, selecting the OPTIMAL SALES REVENUE AMOUNT as the parameter and consistently using it through the computer implemented method. The computer implemented method begins in block 2002.

In block 2002, a boundary constrained shelf space is defined. The boundary constrained shelf space is managed by a customer. A customer can be an operator, store owner, corporate entity, or other, as may be required and/or desired in a particular embodiment. The computer implemented method moves to block 2004.

In block 2004 a product mix is placed within the boundary constrained shelf space. The product mix comprising at least one of a product type. The product type can further comprise a product SKU, a product price, a product placement recommendation, and product size within the boundary constrained shelf space. The computer implemented method moves to block 2006.

In block 2006, a product mix ranking is created based, in part, on prior sales of each of the product type. Such a product mix ranking provides relevant sales tracking information which can be used to compare with other similar product mix rankings. In an exemplary embodiment, product mix rankings can include product type stock keeping unit (SKU), product type price, products type units sold, and/or other data, as may be required and/or required in a particular embodiment. The computer implemented method moves to block 2008.

In block 2008, developing through algorithmic autonomous learning, an achievable business metric performance of the boundary constrained shelf space by way of at least one of a data processing device, the data processing device having a memory which is encoded with instructions that when executed perform at least the following steps starting in block 2010.

In block 2010, a group based, in part, on the boundary constrained shelf space and the product mix ranking is identified, the group having at least one of a similar product mix or a similar product mix ranking, the similar product mix comprising at least one of a similar product type. The similar product type further comprising at least one of a similar product SKU, a similar product price, a similar product placement recommendation, or a similar product size within a similar boundary constrained shelf space. The computer implemented method moves to block 2012.

In block 2012, the computer implemented method can be optimized around either an OPTIMAL BUSINESS METRIC or an OPTIMAL SALES REVENUE AMOUNT or a FUTURE SALE AMOUNT. In this regard, the selected optimization parameter is determined, in view of, if present, at least one of a business rule, for the boundary constrained shelf space starting in block 2014.

In block 2014, an ideal product mix ranking is optimized using the product mix and algorithmic autonomous learning from at least some of the similar product mix or the similar product mix ranking from the group, the ideal product mix comprising at least one of an ideal product type. Each of the ideal product types further comprising at least one of an ideal product SKU, an ideal product price, an ideal product placement recommendation, or an ideal product size within the boundary constrained shelf space. The computer implemented method moves to block 2016.

In block 2016, the ideal product mix ranking is converted into at least one of an ideal product mix or an ideal product type placement within the boundary constrained shelf space. The computer implemented method moves to block 2018.

In block 2018, if present, the algorithmic impact of the business rule on the ideal product mix is applied, the ideal product mix ranking, or the ideal product type placement within the boundary constrained shelf space. The computer implemented method moves to block 2020.

In block 2020, through simulation, sales of the ideal product mix over time to achieve the selected optimization parameter forecast. The selected optimization parameter can be the OPTIMAL BUSINESS METRIC, or the OPTIMAL SALES REVENUE AMOUNT, or the FUTURE SALE AMOUNT. The computer implemented method moves to block 2022.

In block 2022, space-product-price awareness is created for the customer by displaying details, values, or recommendations based on at least one of the OPTIMAL BUSINESS METRIC, the OPTIMAL SALES REVENUE AMOUNT, the FUTURE SALE AMOUNT, the ideal product mix, or the ideal product type placement within the boundary constrained shelf space. The computer implemented method moves to block 2024.

In block 2024, the computer implemented method returns to the step of defining, to track and optimize parameter over time. The optimized parameter can be the OPTIMAL BUSINESS METRIC or the OPTIMAL SALES REVENUE AMOUNT or the FUTURE SALE AMOUNT.

Figure 6:
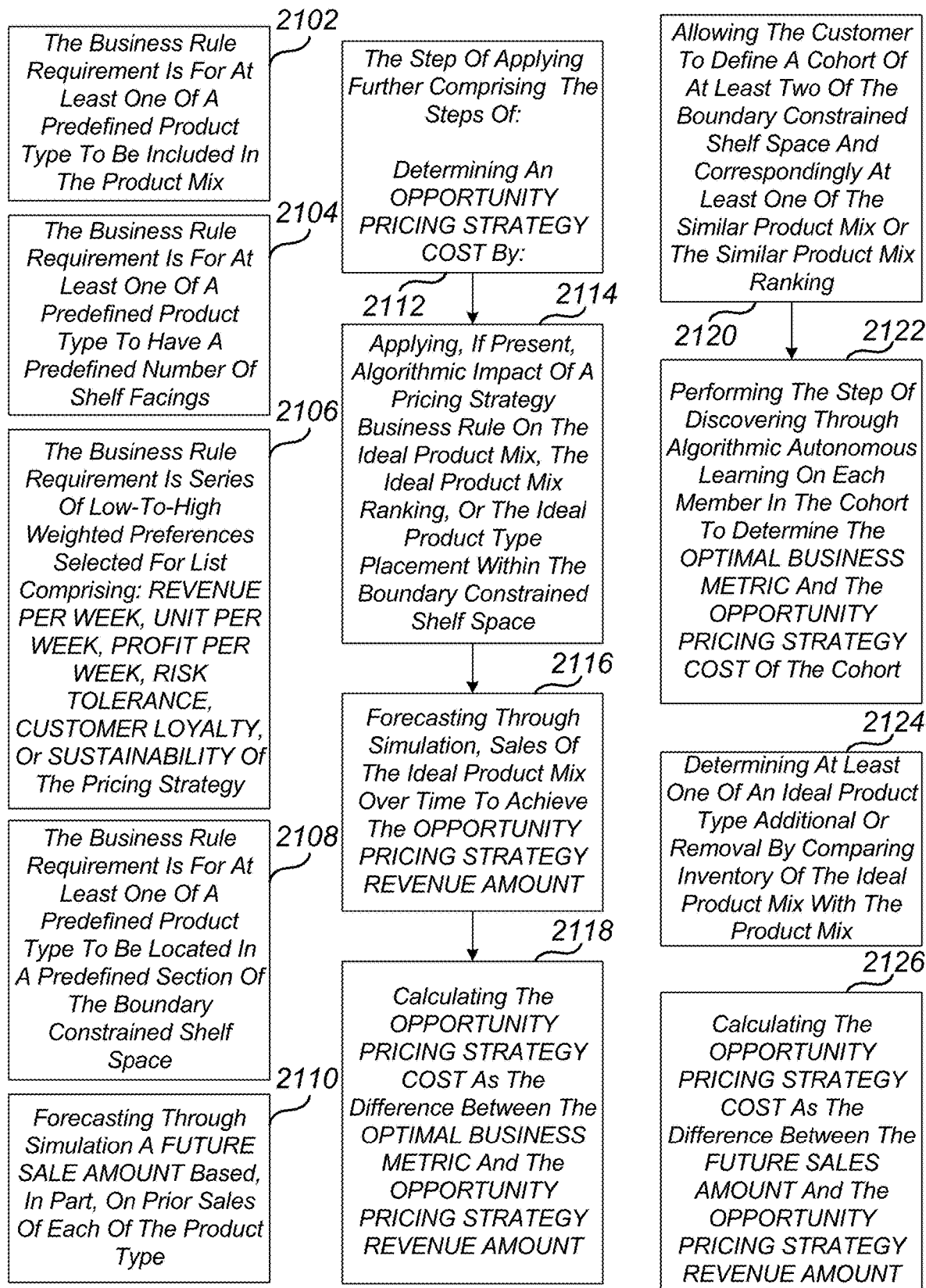
FIGS. 6-7 illustrates exemplary embodiments of a computer implemented method of determining optimal business metrics from a product mix.
Figure 7:
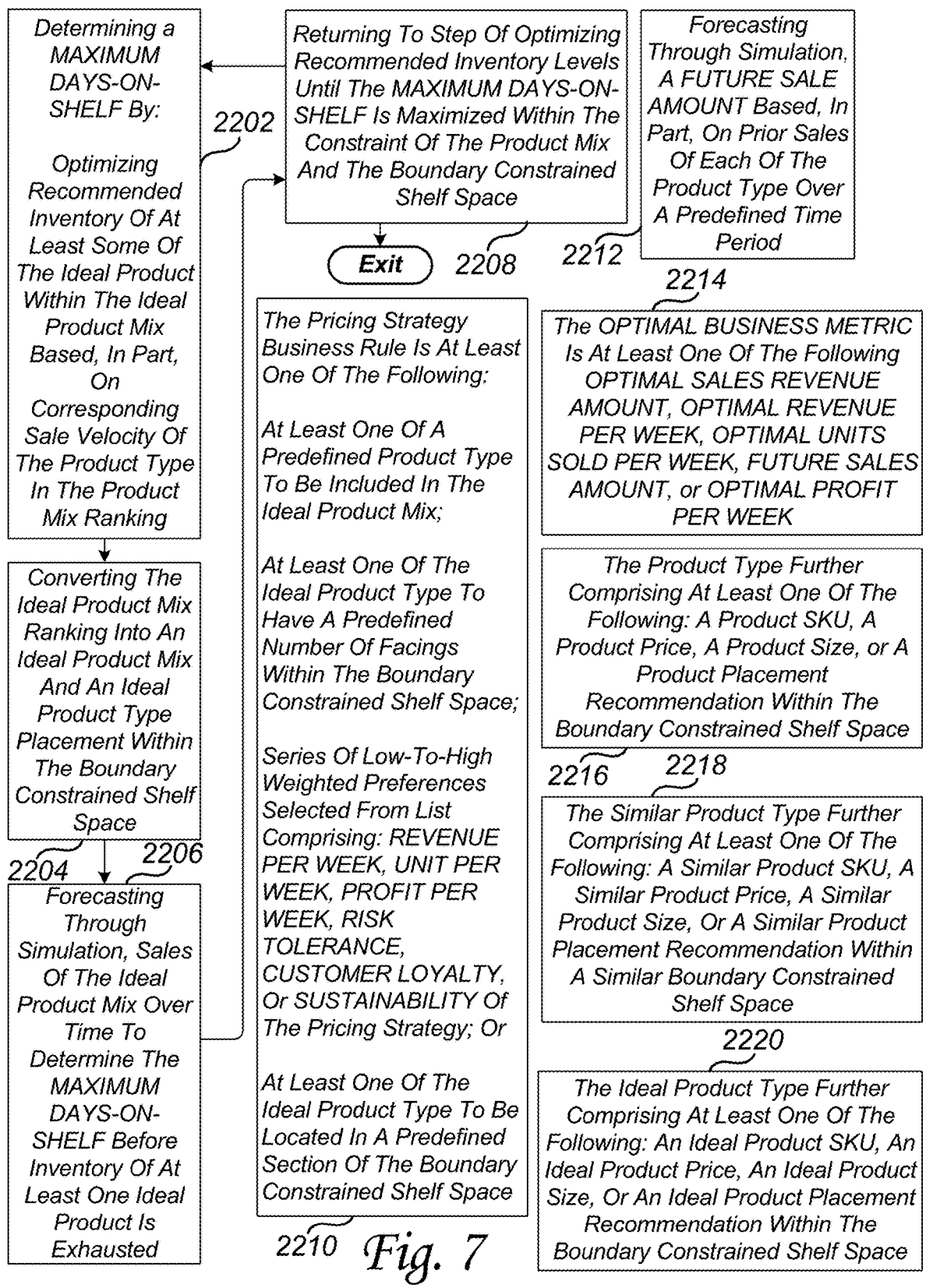

Referring to FIGS. 6 and 7, there is illustrated exemplary embodiments of a computer implemented method of determining optimal business metrics from a product mix. Such exemplary embodiments can be interchangeably used with the computer implemented methods of the present invention.

In block 2102, the business rule requirement is for at least one of a predefined product type to be included in the product mix.

In block 2104, the business rule requirement is for at least one of the product type to have a predefined number of facings within the boundary constrained shelf space. In this regard, a facing is when a product faces the customer. As an example, three product facings would mean the customer when facing the shelf would view three rows of the product.

In block 2106, the business rule requirement is a series of low-to-high weighted preferences, at least one selected from the list comprising: REVENUE PER WEEK, UNIT PER WEEK, PROFIT PER WEEK, RISK TOLERANCE, CUSTOMER LOYALTY, or SUSTAINABILITY of the pricing strategy.

In block 2108, the business rule requirement is for at least one of a predefined product type to be located in a predefined section of the boundary constrained shelf space.

In block 2110, through simulation a FUTURE SALE AMOUNT based, in part, on prior sales of each of the product type over a predefined time period is forecast. In an exemplary embodiment, the FUTURE SALE AMOUNT can be expressed over a time period such as FUTURE SALE AMOUNT per week, month, year, or other.

In block 2112, the step of applying further comprises the steps of determining an OPPORTUNITY PRICING STRATEGY COST then moves to block 2114.

In block 2114, if present, an algorithmic impact of a pricing strategy business rule is applied on the ideal product mix, the ideal product mix ranking, or the ideal product type placement within the boundary constrained shelf space. The computer implemented method moves to block 2116.

In block 2116 through simulation, sales of the ideal product mix over time to achieve the OPPORTUNITY PRICING STRATEGY REVENUE AMOUNT are forecast. The computer implemented method moves to block 2118.

In block 2118, the OPPORTUNITY PRICING STRATEGY COST is calculated as the difference between the OPTIMAL BUSINESS METRIC and the OPPORTUNITY PRICING STRATEGY REVENUE AMOUNT. The OPTIMAL BUSINESS METRIC is either an OPTIMAL SALES REVENUE AMOUNT or the FUTURE SALES AMOUNT.

In block 2120, the customer is allowed to define a cohort of at least two of the boundary constrained shelf space and correspondingly at least one of the similar product mix or the similar product mix ranking. The computer implemented method moves to block 2122.

In block 2122, the step of discovering is performed, through algorithmic autonomous learning, on each member in the cohort to determine at least the OPTIMAL BUSINESS METRIC and the OPPORTUNITY PRICING STRATEGY COST of the cohort.

In block 2124, the memory encoded with instructions further comprising the step of determining at least one of the ideal product type addition or removal by comparing inventory of the ideal product mix with the product mix.

In block 2126, the OPPORTUNITY PRICING STRATEGY COST is calculated as the difference between the FUTURE SALE AMOUNT and the OPPORTUNITY PRICING STRATEGY REVENUE AMOUNT.

With reference to FIG. 7, in block 2202 the memory encoded with instructions further comprising the steps of determining a MAXIMUM DAYS-ON-SHELF and optimizing recommended inventory levels of at least some of the ideal product within the ideal product mix based, in part, on corresponding sale velocity of the product type in the product mix ranking. The computer implemented method moves to block 2202.

In block 2202, the ideal product mix ranking is converted into an ideal product mix and an ideal product type placement within the boundary constrained shelf space. The computer implemented method moves to block 2204.

In block 2204, if present, the algorithmic impact of a maximum days-on-shelf business rule is applied on the ideal product mix, the ideal product mix ranking, or the ideal product type placement within the boundary constrained shelf space. The computer implemented method moves to block 2206.

In block 2206, through simulation, sales of the ideal product mix over time are forecasted to determine the MAXIMUM DAYS-ON-SHELF before inventory of at least one ideal product is exhausted. The computer implemented method moves to block 2208.

In block 2208, the computer implemented method returns to step of optimizing recommended inventory levels until the MAXIMUM DAYS-ON-SHELF is maximized within the constraint of the product mix and the boundary constrained shelf space.

In block 2210, the pricing strategy business rule is at least one of the following:

at least one of a predefined product type to be included in the ideal product mix;

at least one of the ideal product type to have a predefined number of facings within the boundary constrained shelf space;

series of low-to-high weighted preferences, at least one selected from list comprising: REVENUE PER WEEK, UNIT PER WEEK, PROFIT PER WEEK, RISK TOLERANCE, CUSTOMER LOYALTY, or SUSTAINABILITY of the pricing strategy; or at least one of the ideal product type to be located in a predefined section of the boundary constrained shelf space.

In block 2212, through simulation, a FUTURE SALE AMOUNT based, in part, on prior sales of each of the product type over a predefined time period is forecast. In an exemplary embodiment, such time period could be days, weeks, months, year, or other time periods, as may be required and/or desired in a particular embodiment.

In block 2214, the OPTIMAL BUSINESS METRIC is at least one of the following OPTIMAL SALES REVENUE AMOUNT, OPTIMAL REVENUE PER WEEK, OPTIMAL UNITS SOLD PER WEEK, FUTURE SALE AMOUNT, or OPTIMAL PROFIT PER WEEK.

In block 2216, the product type further comprising at least one of the following: a product SKU, a product price, a product size, or a product placement recommendation within the boundary constrained shelf space.

In block 2218, the similar product type further comprising at least one of the following: a similar product SKU, a similar product price, a similar product size, or a similar product placement recommendation within a similar boundary constrained shelf space.

In block 2220, the ideal product type further comprising at least one of the following: an ideal product SKU, an ideal product price, an ideal product size, or an ideal product placement recommendation within the boundary constrained shelf space.

Figure 8A:
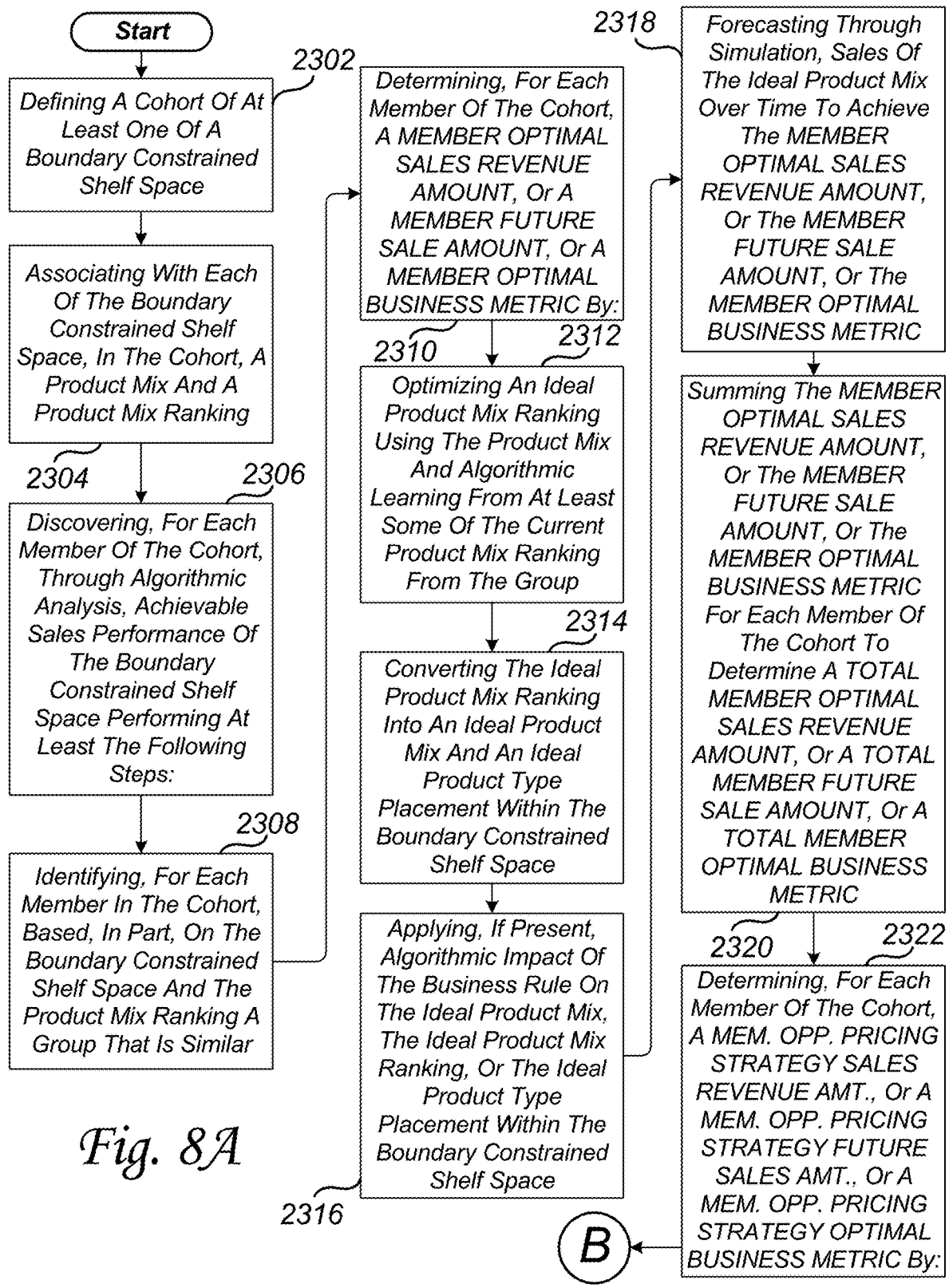
FIGS. 8A-8B illustrates one example of a computer implemented method of determining the cost of implementing a pricing strategy.
Figure 8B:
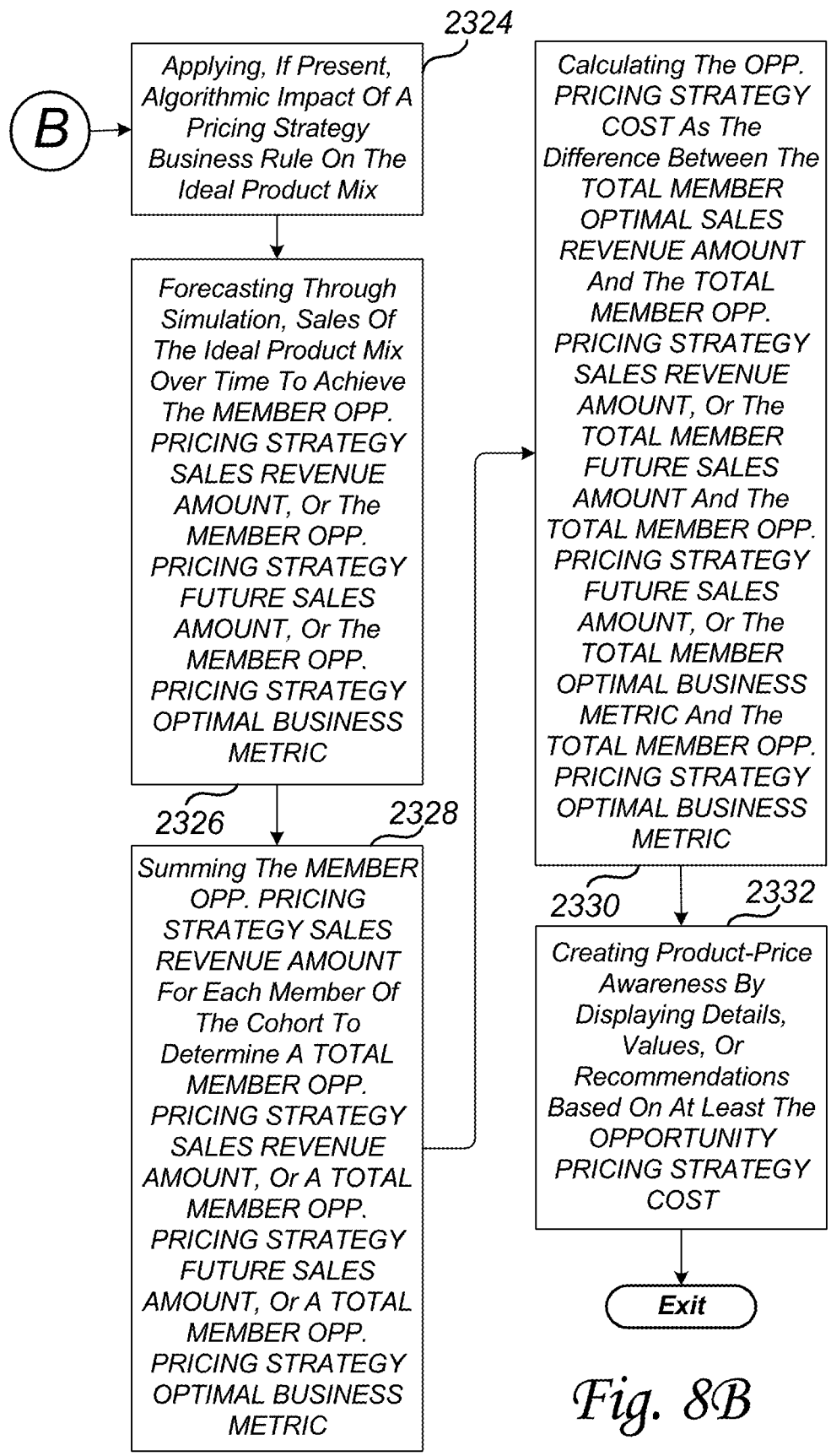

Referring to FIGS. 8A and 8B, there is illustrated one example of a computer implemented method of determining the cost of implementing a pricing strategy, the pricing strategy formed by changeable business rules which engender algorithmic constraints, impacting optimized business metrics.

In an exemplary embodiment the OPPORTUNITY PRICING STRATEGY COST can be determined by using several different types of parameters. Such parameters can selectively be an OPTIMAL BUSINESS METRIC, a FUTURE SALES AMOUNT, or an OPTIMAL SALES REVENUE AMOUNT. The computer implemented methods, in the present invention, illustrate selection between all three parameters. In operation, ideally one parameter at a time would be selected and consistently utilized throughout the computer implemented method to perform the analysis. As an example and not a limitation, selecting the OPTIMAL SALES REVENUE AMOUNT as the parameter and consistently using it through the computer implemented method. The computer implemented method begins in block 2302.

In block 2302, a cohort of at least one of a boundary constrained shelf space is defined. The computer implemented method moves to block 2304.

In block 2304, each of the boundary constrained shelf space, in the cohort, is associated with a product mix, and a product mix ranking. The computer implemented method moves to block 2306.

In block 2306, for each member in the cohort, through algorithmic autonomous learning, an achievable business metric performance of the boundary constrained shelf space is discovered by way of at least one of a data processing device, the data processing device having a memory which is encoded with instructions that when executed perform at least the following steps starting in block 2308.

In block 2308, for each member of the cohort, a group based, in part, on the boundary constrained shelf space and the product mix ranking is identified, the group having at least one of a similar product mix or a similar product mix ranking. The computer implemented method then moves to block 2310.

In block 2310, for each member of the cohort, around either a MEMBER OPTIMAL SALES REVENUE AMOUNT or a MEMBER FUTURE SALE AMOUNT, or a MEMBER OPTIMAL BUSINESS is determined, in view of, if present, at least one of a business rule, for the boundary constrained shelf space starting in block 2312.

In block 2312, an ideal product mix ranking is optimized using the product mix and algorithmic autonomous learning from at least some of the similar product mix or the similar product mix ranking from the group. The computer implemented method moves to block 2314.

In block 2314, the ideal product mix ranking is converted into at least one of an ideal product mix or an ideal product type placement within the boundary constrained shelf space. The computer implemented method moves to block 2316.

In block 2316, if present, the algorithmic impact of at least one of a business rule on the ideal product mix is applied, the ideal product mix ranking, or the ideal product type placement within the boundary constrained shelf space. The computer implemented method moves to block 2318.

In block 2318, for each member of the cohort, through simulation, sales of the ideal product mix over time to achieve the selected optimization parameter forecast. The optimization parameter can be the MEMBER OPTIMAL SALES REVENUE AMOUNT, or the MEMBER FUTURE SALE AMOUNT, or the MEMBER OPTIMAL BUSINESS METRIC. The computer implemented method moves to block 2320.

In block 2320, the MEMBER OPTIMAL SALES REVENUE AMOUNT, or the MEMBER FUTURE SALE AMOUNT, or the MEMBER OPTIMAL BUSINESS METRIC is summed for each member of the cohort to determine a TOTAL MEMBER OPTIMAL SALES REVENUE AMOUNT, or a TOTAL MEMBER FUTURE SALE AMOUNT, or a TOTAL MEMBER OPTIMAL BUSINESS METRIC respectively. The computer implemented method moves to block 2322.

In block 2322, for each member of the cohort, a MEMBER OPPORTUNITY PRICING STRATEGY SALES REVENUE AMOUNT, or a MEMBER OPPORTUNITY PRICING STRATEGY FUTURE SALE AMOUNT, or a MEMBER OPPORTUNITY PRICING STRATEGY OPTIMAL BUSINESS METRIC is determined, starting in block 2324.

With reference to FIG. 8B, in block 2324, if present, the algorithmic impact of a pricing strategy business rule on the ideal product mix is applied, the ideal product mix ranking, or the ideal product type placement within the boundary constrained shelf space. The computer implemented method moves to block 2326.

In block 2326, through simulation, sales of the ideal product mix over time to achieve the MEMBER OPPORTUNITY PRICING STRATEGY SALES REVENUE AMOUNT, or the MEMBER OPPORTUNITY PRICING STRATEGY FUTURE SALE AMOUNT, or the MEMBER OPPORTUNITY PRICING STRATEGY OPTIMAL BUSINESS METRIC are forecast. The computer implemented method moves to block 2328.

In block 2328, the MEMBER OPPORTUNITY PRICING STRATEGY SALES REVENUE AMOUNT, or the MEMBER OPPORTUNITY PRICING STRATEGY FUTURE SALE AMOUNT, or the MEMBER OPPORTUNITY PRICING STRATEGY OPTIMAL BUSINESS METRIC determined for each member of the cohort is summed to determine a TOTAL MEMBER OPPORTUNITY PRICING STRATEGY SALES REVENUE AMOUNT, or a TOTAL MEMBER OPPORTUNITY PRICING STRATEGY FUTURE SALE AMOUNT, or a TOTAL MEMBER OPPORTUNITY PRICING STRATEGY OPTIMAL BUSINESS METRIC accordingly. The computer implemented method moves to block 2330.

In block 2330, the OPPORTUNITY PRICING STRATEGY COST is calculated as the difference between the TOTAL MEMBER OPTIMAL SALES REVENUE AMOUNT and the TOTAL MEMBER OPPORTUNITY PRICING STRATEGY REVENUE AMOUNT, or the TOTAL MEMBER FUTURE SALE AMOUNT and the TOTAL MEMBER OPPORTUNITY PRICING STRATEGY FUTURE SALE AMOUNT, or the TOTAL MEMBER OPTIMAL BUSINESS METRIC and the TOTAL MEMBER OPPORTUNITY PRICING STRATEGY OPTIMAL BUSINESS METRIC accordingly. The computer implemented method moves to block 2332.

In block 2332, space-product-price awareness is created by displaying details, values, or recommendations based on at least OPPORTUNITY PRICING STRATEGY COST. The computer implemented method is then exited.

Figure 9:
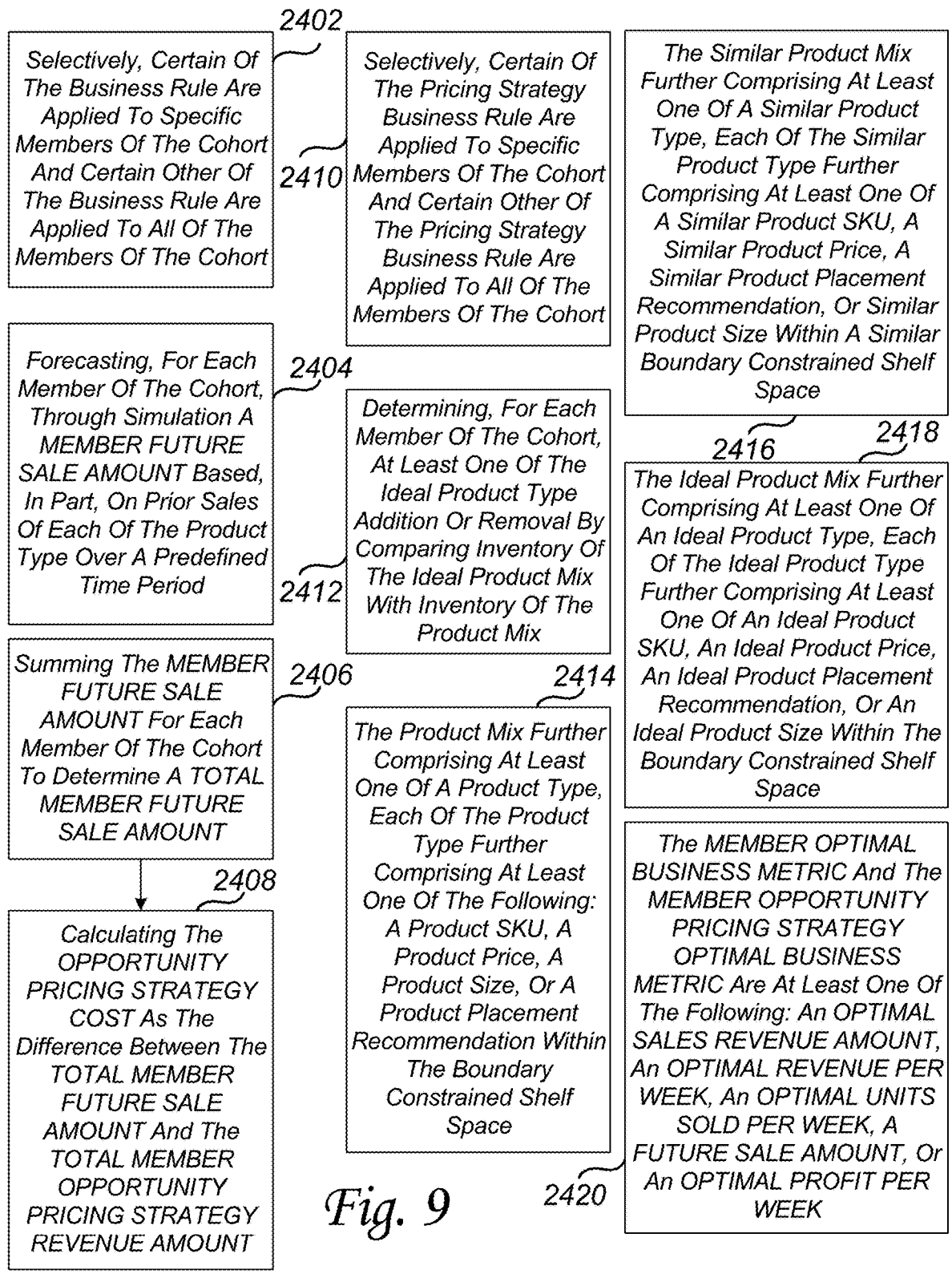
FIG. 9 illustrates exemplary embodiments of a computer implemented method of determining the cost of implementing a pricing strategy.

Referring to FIG. 9, there are illustrated exemplary embodiments of a computer implemented method of determining the cost of implementing a pricing strategy. Such exemplary embodiments can be interchangeably used with the computer implemented methods of the present invention.

In block 2402, selectively, certain of the business rule is applied to specific members of the cohort and certain other of the business rule is applied to all of the members of the cohort.

In block 2404, for each member of the cohort, through simulation, a MEMBER FUTURE SALE AMOUNT based, in part, on prior sales of each of the product type over a predefined time period is forecasted.

In block 2406, the MEMBER FUTURE SALE AMOUNT is summed for each member of the cohort to determine a TOTAL MEMBER FUTURE SALE AMOUNT. The computer implemented method moves to block 2408.

In block 2408, the OPPORTUNITY PRICING STRATEGY COST is calculated as the difference between the TOTAL MEMBER FUTURE SALE AMOUNT and the TOTAL MEMBER OPPORTUNITY PRICING STRATEGY REVENUE AMOUNT.

In block 2410, selectively, certain of the pricing strategy business rule is applied to specific members of the cohort and certain other of the pricing strategy business rule is applied to all of the members of the cohort.

In block 2412, the memory encoded with instructions further comprising the step of determining, for each member of the cohort, at least one of the ideal product type addition or removal by comparing inventory of the ideal product mix with the inventory of the product mix.

In block 2414, the product mix further comprising at least one of a product type, each of the product type further comprising at least one of the following: a product SKU, a product price, a product size, or a product placement recommendation within the boundary constrained shelf space, the product mix ranking is created based, in part, on prior sales of each of the product type.

In block 2416, the similar product mix further comprising at least one of a similar product type, each of the similar product type further comprising at least one of the following: a similar product SKU, a similar product price, a similar product size, a similar product placement recommendation within a similar boundary constrained shelf space.

In block 2418, the ideal product mix further comprising at least one of an ideal product type, each of the ideal product type further comprising at least one of the following: an ideal product SKU, an ideal product price, an ideal product placement recommendation, or an ideal product size within the boundary constrained shelf space.

In block 2420, the MEMBER OPTIMAL BUSINESS METRIC and the MEMBER OPPORTUNITY PRICING STRATEGY OPTIMAL BUSINESS METRIC are at least one of the following: an OPTIMAL SALES REVENUE AMOUNT, an OPTIMAL REVENUE PER WEEK, an OPTIMAL UNITS SOLD PER WEEK, a FUTURE SALE AMOUNT, or an OPTIMAL PROFIT PER WEEK.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method of making product mix changes such as product additions, subtractions, or pricing changes on a boundary constrained shelf space located in a store by determining optimal business metrics, the computer-implemented method comprising the steps of:
defining a cohort that comprises one or more of a boundary constrained shelf space, each of the boundary constrained shelf space, in the cohort, is managed by one or more of a customer, a product mix is constrained by the boundary constrained shelf space and by at least one of a business rule;
placing, physically, the product mix within each of the boundary constrained shelf space, the product mix comprising at least one of a product type, composition of the product type within the product mix can vary between each of the boundary constrained shelf space, sales of the product type for each of the boundary constrained shelf space is stored as a plurality of sales data by one or more of a computing device associated with the customer;
configuring at least one of a data processing device comprising a server, the server comprising a database for storing one or more of the plurality of sales data, the server further comprising a microprocessor and a memory, the server is configured to communicate data or reports across a global communication network with at least one of the computing device associated with the customer, the memory is encoded with instructions that when executed by the microprocessor perform the steps of:
creating and storing in a database, by the server, plurality of a product mix ranking based, in part, on the plurality of sales data from more than one of the boundary constrained shelf space, the product mix is physically placed within the boundary constrained shelf space, the product mix comprising at least one of the product type, the boundary constrained shelf space is managed by the customer;
determining, by the server, through algorithmic autonomous learning, an optimal business metric value which is achievable given the limitation of the boundary constrained shelf space, the data processing device is encoded with instructions that when executed, by the microprocessor, perform at least the following steps:
identifying, by the server, a group based, in part, on the boundary constrained shelf space in the cohort and plurality of the product mix ranking, the group having at least one of a similar product mix or a similar product mix ranking, the similar product mix comprising at least one of a similar product type;
determining, by the server, the optimal business metric value, in view of at least one of the business rule by steps of:
optimizing an ideal product mix ranking, by the server, by way of learning from sales activity to determine the best achievable value of the optimal business metric by altering the product mix with at least some of the similar product mix or the similar product mix ranking from the group, the ideal product mix comprising at least one of an ideal product type;
converting, by the server, the ideal product mix ranking into at least one of an ideal product mix and an ideal product type placement within the boundary constrained shelf space, the ideal product mix ranking comprising at least one of the ideal product type;
applying, by the server, algorithmic impact of the business rule requirement on the ideal product mix, the ideal product mix ranking, or the ideal product type placement within the boundary constrained shelf space; and
forecasting, by the server, through simulation, sales of the ideal product mix to achieve the optimal business metric;
creating space-product-price awareness for the customer by displaying at least the optimal business metric details, values, or a plurality of recommendations based on the optimal business metric, the ideal product mix, or the ideal product type placement within the boundary constrained shelf space; and
implementing, by the customer, the plurality of recommendations with the product mix within the boundary constrained shelf space to realize the maximum days-on-shelf.

2. The computer-implemented method in accordance with claim 1, the business rule requirement is for at least one of a predefined product type to be included in the product mix.

3. The computer-implemented method in accordance with claim 1, the business rule requirement is for at least one of the product type to have a predefined number of product facings within the boundary constrained shelf space.

4. The computer-implemented method in accordance with claim 1, the business rule requirement is a series of low-to-high weighted preferences, at least one selected from list comprising: a revenue per week, a unit per week, a profit per week, a risk tolerance, a customer loyalty, or a sustainability of the pricing strategy.

5. The computer-implemented method in accordance with claim 1, the business rule requirement is for at least one of a predefined product type to be located in a predefined section of the boundary constrained shelf space.

6. The computer-implemented method in accordance with claim 1, further comprising:
forecasting, by the server, through simulation a future sale amount based, in part, on prior sales of each of the product type over a predefined time period.

7. The computer-implemented method in accordance with claim 1, the step of determining, by the server, through algorithmic autonomous learning, the optimal business metric value which is achievable given the limitation of the boundary constrained shelf space further comprising steps of:
determining an opportunity pricing strategy cost by the steps of:

applying, by the server, algorithmic impact of a pricing strategy business rule requirement on the ideal product mix, the ideal product mix ranking, or the ideal product type placement within the boundary constrained shelf space;

forecasting, by the server, through simulation, sales of the ideal product mix to achieve the opportunity pricing strategy revenue amount; and calculating, by the server, the opportunity pricing strategy cost as the difference between the optimal business metric and the opportunity pricing strategy revenue amount, the optimal business metric is either an optimal sales revenue amount or a future sales amount.

8. The computer-implemented method in accordance with claim 7, further comprising:

allowing the customer to define a cohort of at least two of the boundary constrained shelf space and correspondingly at least one of the similar product mix or the similar product mix ranking; and performing the step of determining, by the server, through algorithmic autonomous learning, an optimal business metric value which is achievable given the limitation of the boundary constrained shelf space on each member in the cohort to determine at least the optimal business metric and the opportunity pricing strategy cost of the cohort.

9. The computer-implemented method in accordance with claim 7, further comprising the steps of:

forecasting, by the server, through simulation the future sale amount based, in part, on prior sales of each of the product type over a predefined time period; and calculating, by the server, the opportunity pricing strategy cost as the difference between the future sale amount and the opportunity pricing strategy revenue amount.

10. The computer-implemented method in accordance with claim 7, the pricing strategy business rule is at least one of the following:

at least one of a predefined product type to be included in the ideal product mix;

at least one of the ideal product type to have a predefined number of facings within the boundary constrained shelf space;

series of low-to-high weighted preferences, at least one selected from list comprising: revenue per week, unit per week, profit per week, risk tolerance, customer loyalty, or sustainability of the pricing strategy; or at least one of the ideal product type to be located in a predefined section of the boundary constrained shelf space.

11. The computer-implemented method in accordance with claim 1, the step of determining, by the server, through algorithmic autonomous learning, the optimal business metric value which is achievable given the limitation of the boundary constrained shelf space further comprising the step of:

determining, by the server, at least one of the ideal product type addition or removal by comparing inventory of the ideal product mix with the product mix.

12. The computer-implemented method in accordance with claim 1, the step of determining, by the server, through algorithmic autonomous learning, the optimal business metric value which is achievable given the limitation of the boundary constrained shelf space further comprising the steps of:

determining a maximum days-on-shelf by:

optimizing the ideal product mix ranking, by the server, by way of learning from sales activity from at least some of the similar product mix or the similar product mix ranking from the group;

converting, by the server, the ideal product mix ranking into at least one of an ideal product mix and an ideal product type placement within the boundary constrained shelf space, the ideal product mix ranking comprising at least one of the ideal product type;

applying, by the server, algorithmic impact of a maximum days-on-shelf business rule on the ideal product mix, the ideal product mix ranking, or the ideal product type placement within the boundary constrained shelf space; and forecasting, by the server, through simulation, sales of the ideal product mix to determine the maximum days-on-shelf before inventory of at least one ideal product is exhausted.

13. The computer-implemented method in accordance with claim 1, the optimal business metric is at least one of the following: an optimal sales revenue amount, an optimal revenue per week, an optimal units sold per week, a future sale amount, or an optimal profit per week.

14. The computer-implemented method in accordance with claim 1, the product type further comprising at least one of the following: a product SKU, a product price, a product size, or a product placement recommendation within the boundary constrained shelf space.

15. The computer-implemented method in accordance with claim 1, the similar product type further comprising at least one of a similar product SKU, a similar product price, a similar product placement recommendation, or a similar product size within a similar boundary constrained shelf space.

16. The computer-implemented method in accordance with claim 1, the ideal product type further comprising at least one of an ideal product SKU, an ideal product price, an ideal product placement recommendation, or an ideal product size within the boundary constrained shelf space.

17. A computer-implemented method of making product mix changes such as product additions, subtractions, or pricing changes on a boundary constrained shelf space located in a store by determining optimal business metrics, the computer-implemented method comprising the steps of:

defining a cohort that comprises one or more of a boundary constrained shelf space, each of the boundary constrained shelf space, in the cohort, is managed by one or more of a customer, a product mix is constrained by the boundary constrained shelf space and by at least one of a business rule;

placing, physically, the product mix within each of the boundary constrained shelf space, the product mix comprising at least one of a product type, composition of the product type within the product mix can vary between each of the boundary constrained shelf space, sales of the product type for each of the boundary constrained shelf space is stored as a plurality of sales data by one or more of a computing device associated with the customer;

configuring at least one of a data processing device comprising a server, the server comprising a database for storing one or more of the plurality of sales data, the server further comprising a microprocessor and a memory, the server is configured to communicate data or reports across a global communication network with at least one of the computing device associated with the customer, the memory is encoded with instructions that when executed by the microprocessor perform the steps of:

creating, by the server, and storing in a database, by the server, plurality of a product mix ranking based, in part, on the plurality of sales data from more than one of the boundary constrained shelf spaces, the product mix is physically placed within the boundary constrained shelf space, the product mix comprising at least one of the product type, the boundary constrained shelf space is managed by the customer;

determining, by the server, through algorithmic autonomous learning, an optimal sales revenue amount value which is achievable given the limitation of the boundary constrained shelf space, the data processing device is encoded with instructions that when executed, by the microprocessor, perform at least the following steps:

identifying, by the sever, a group based, in part, on the boundary constrained shelf space in the cohort and plurality of the product mix ranking, the group having at least one of a similar product mix or a similar product mix ranking, the similar product mix comprising at least one of a similar product type;

determining, by the server, the optimal sales revenue amount value, in view of at least one of business rule by steps of:

optimizing an ideal product mix ranking, by the server, by learning from sales activity to determine the best achievable value of the optimal sales revenue amount by altering the product mix with at least some of the similar product mix or the similar product mix ranking from the group, the ideal product mix comprising at least one of an ideal product type;

converting, by the server, the ideal product mix ranking into at least one of an ideal product mix and an ideal product type placement within the boundary constrained shelf space, the ideal product mix ranking comprising at least one of the ideal product type;

applying, by the server, algorithmic impact of the business rule requirement on the ideal product mix, the ideal product mix ranking, or the ideal product type placement within the boundary constrained shelf space; and forecasting, by the server, through simulation, sales of the ideal product mix to achieve the optimal sales revenue amount;

creating space-product-price awareness for the customer by displaying at least the optimal sales revenue amount details, values, or a plurality of recommendations based on the optimal sales revenue amount, the ideal product mix, or the ideal product type placement within the boundary constrained shelf space; and implementing, by the customer, the plurality of recommendations with the product mix within the boundary constrained shelf space to realize the maximum days-on-shelf.

18. The computer-implemented method in accordance with claim 17, the step of applying, further comprising the steps of:

determining, by the server, an opportunity pricing strategy cost by:

applying, by the server, algorithmic impact of a pricing strategy business rule on the ideal product mix, the ideal product mix ranking, or the ideal product type placement within the boundary constrained shelf space;

forecasting, by the server, through simulation, sales of the ideal product mix to achieve the opportunity pricing strategy revenue amount; and calculating, by the server, the opportunity pricing strategy cost as the difference between the optimal sales revenue amount and the opportunity pricing strategy revenue amount.

19. A computer-implemented method of making product mix changes such as product additions, subtractions, or pricing changes on a boundary constrained shelf space located in a store by determining optimal business metrics, the computer-implemented method comprising the steps of:

defining a cohort that comprises one or more of a boundary constrained shelf space, each of the boundary constrained shelf space, in the cohort, is managed by one or more of a customer, a product mix is constrained by the boundary constrained shelf space and by at least one of a business rule;

placing, physically, the product mix within each of the boundary constrained shelf space, the product mix comprising at least one of a product type, composition of the product type within the product mix can vary between each of the boundary constrained shelf space, sales of the product type for each of the boundary constrained shelf space is stored as a plurality of sales data by one or more of a computing device associated with the customer;

configuring at least one of a data processing device comprising a server, the server comprising a database for storing one or more of the plurality of sales data, the server further comprising a microprocessor and a memory, the server is configured to communicate data or reports across a global communication network with at least one of the computing device associated with the customer, the memory is encoded with instructions that when executed by the microprocessor perform the steps of:

creating and storing in a database, by the server, plurality of a product mix ranking based, in part, on the plurality of sales data from more than one of the boundary constrained shelf spaces, the product mix is physically placed within the boundary constrained shelf space, the product mix comprising at least one of the product type, the boundary constrained shelf space is managed by the customer;

determining, by the server, through algorithmic autonomous learning, a future sales amount value which is achievable given the limitation of the boundary constrained shelf space, the data processing device is encoded with instructions that when executed, by the microprocessor, perform at least the following steps:

identifying, by the server, a group based, in part, on the boundary constrained shelf space in the cohort and plurality of the product mix ranking, the group having at least one of a similar product mix or a similar product mix ranking, the similar product mix comprising at least one of a similar product type;

determining, by the server, the future sales amount value, in view of, at least one of the business rule by the steps of:

optimizing an ideal product mix ranking, by the server, by learning from sales activity to determine the best achievable value of the future sales amount by altering the product mix with at least some of the similar product mix or the similar product mix ranking from the group, the ideal product mix comprising at least one of an ideal product type;

converting, by the server, the ideal product mix ranking into at least one of an ideal product mix and an ideal product type placement within the boundary constrained shelf space, the ideal product mix ranking comprising at least one of the ideal product type;

applying, by the server, algorithmic impact of the business rule requirement on the ideal product mix, the ideal product mix ranking, or the ideal product type placement within the boundary constrained shelf space; and forecasting, by the server, through simulation, sales of the ideal product mix to achieve the future sales amount;

creating space-product-price awareness for the customer by displaying at least the future sales amount details, values, or a plurality of recommendations based on at least one of the future sales amount, the ideal product mix, or the ideal product type placement within the boundary constrained shelf space; and implementing, by the customer, the plurality of recommendations with the product mix within the boundary constrained shelf space to realize the future sales amount.

20. The computer-implemented method in accordance with claim 19, the step of determining, by the server, through algorithmic autonomous learning, the optimal business metric value which is achievable given the limitation of the boundary constrained shelf space further comprising the steps of:

determining a maximum days-on-shelf by:

optimizing, the ideal product mix ranking, by the server, by way of learning from sales activity from at least some of the similar product mix or the similar product mix ranking from the group;

converting, by the server, the ideal product mix ranking into at least one of an ideal product mix and an ideal product type placement within the boundary constrained shelf space, the ideal product mix ranking comprising at least one of the ideal product type;

applying, by the server, algorithmic impact of a maximum days-on-shelf business rule on the ideal product mix, the ideal product mix ranking, or the ideal product type placement within the boundary constrained shelf space; and forecasting, by the server, through simulation, sales of the ideal product mix to determine the maximum days-on-shelf before inventory of at least one ideal product is exhausted.

\* \* \* \* \*